(12) United States Patent
Li et al.

(10) Patent No.: US 12,289,144 B2
(45) Date of Patent: Apr. 29, 2025

(54) SPATIAL SENSING TECHNIQUES FOR SIDELINK COMMUNICATIONS

(71) Applicant: QUALCOMM Incorporated, San Diego, CA (US)

(72) Inventors: Qing Li, Princeton Junction, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 18/461,377

(22) Filed: Sep. 5, 2023

(65) Prior Publication Data
US 2025/0080171 A1    Mar. 6, 2025

(51) Int. Cl.
*H04B 7/0408* (2017.01)
*H04B 7/06* (2006.01)
*H04W 72/50* (2023.01)

(52) U.S. Cl.
CPC ......... *H04B 7/0408* (2013.01); *H04B 7/0695* (2013.01); *H04W 72/50* (2023.01)

(58) Field of Classification Search
CPC .... H04B 7/0408; H04B 7/0695; H04W 72/50
See application file for complete search history.

(56) References Cited

U.S. PATENT DOCUMENTS

| | | | |
|---|---|---|---|
| 2022/0116913 A1* | 4/2022 | Hosseini | H04W 72/56 |
| 2022/0167376 A1* | 5/2022 | Ryu | H04W 72/1263 |
| 2022/0232626 A1* | 7/2022 | Li | H04W 76/28 |
| 2023/0035313 A1* | 2/2023 | Xue | H04W 72/044 |
| 2023/0354376 A1* | 11/2023 | Chae | H04W 72/563 |

* cited by examiner

*Primary Examiner* — Janice N Tieu
(74) *Attorney, Agent, or Firm* — Holland & Hart LLP

(57) ABSTRACT

Methods, systems, and devices for wireless communication are described. A first user equipment (UE) may monitor sidelink transmissions, during a sensing window, using multiple active receive beams in accordance with a spatial sensing configuration. The multiple active receive beams may be usable for sidelink reception, and may correspond to multiple active transmit beams that are usable for sidelink transmission. The first UE may select multiple candidate resource sets associated respectively with the multiple active receive beams based on monitoring sidelink transmissions using the multiple active receive beams. The first UE may transmit, to a second UE, using an active transmit beam of the multiple active transmit beams, a sidelink message via one or more resources selected from a candidate resource set of the multiple candidate resource sets. The candidate resource set may be associated with an active receive beam corresponding to the active transmit beam.

30 Claims, 11 Drawing Sheets

SPATIAL SENSING TECHNIQUES FOR SIDELINK COMMUNICATIONS

FIELD OF TECHNOLOGY

The following relates to wireless communication, including spatial sensing techniques for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support spatial sensing techniques for sidelink communications. For example, the described techniques provide for monitoring sidelink transmissions during a sensing window using multiple active receive beams in accordance with a spatial sensing configuration. The multiple active receive beams may be usable for sidelink reception, and may correspond to multiple active transmit beams that are usable for sidelink transmission. The described techniques further provide for selecting multiple candidate resource sets, associated respectively with the multiple active receive beams, based on monitoring sidelink transmissions using the multiple active receive beams. The described techniques further provide for transmitting, using an active transmit beam of the multiple active transmit beams, a sidelink message via one or more resources selected from a candidate resource set of the multiple candidate resource sets. The candidate resource set may be associated with an active receive beam corresponding to the active transmit beam.

A method for wireless communication by a first user equipment (UE) is described. The method may include monitoring sidelink transmissions, during a sensing window, with a set of multiple active receive beams of the first UE in accordance with a spatial sensing configuration of the first UE, where the set of multiple active receive beams are usable for sidelink reception and correspond to a set of multiple active transmit beams of the first UE that are usable for sidelink transmission, selecting a set of multiple candidate resource sets associated respectively with the set of multiple active receive beams, based on monitoring sidelink transmissions with a set of multiple active receive beams, and transmitting, to a second UE via an active transmit beam of the set of multiple active transmit beams, a sidelink message using one or more resources selected from a candidate resource set of the set of multiple candidate resource sets, where the candidate resource set is associated with an active receive beam corresponding to the active transmit beam.

A first UE is described. The first UE may include one or more memories storing processor executable code, and one or more processors coupled with the one or more memories. The one or more processors may individually or collectively operable to execute the code to cause the first UE to monitor sidelink transmissions, during a sensing window, with a set of multiple active receive beams of the first UE in accordance with a spatial sensing configuration of the first UE, where the set of multiple active receive beams are usable for sidelink reception and correspond to a set of multiple active transmit beams of the first UE that are usable for sidelink transmission, select a set of multiple candidate resource sets associated respectively with the set of multiple active receive beams, based on monitoring sidelink transmissions with a set of multiple active receive beams, and transmit, to a second UE via an active transmit beam of the set of multiple active transmit beams, a sidelink message using one or more resources selected from a candidate resource set of the set of multiple candidate resource sets, where the candidate resource set is associated with an active receive beam corresponding to the active transmit beam.

A first UE is described. The first UE may include means for monitoring sidelink transmissions, during a sensing window, with a set of multiple active receive beams of the first UE in accordance with a spatial sensing configuration of the first UE, where the set of multiple active receive beams are usable for sidelink reception and correspond to a set of multiple active transmit beams of the first UE that are usable for sidelink transmission, means for selecting a set of multiple candidate resource sets associated respectively with the set of multiple active receive beams, based on monitoring sidelink transmissions with a set of multiple active receive beams, and means for transmitting, to a second UE via an active transmit beam of the set of multiple active transmit beams, a sidelink message using one or more resources selected from a candidate resource set of the set of multiple candidate resource sets, where the candidate resource set is associated with an active receive beam corresponding to the active transmit beam.

A non-transitory computer-readable medium storing code for wireless communication is described. The code may include instructions executable by a processor to monitor sidelink transmissions, during a sensing window, with a set of multiple active receive beams of the first UE in accordance with a spatial sensing configuration of the first UE, where the set of multiple active receive beams are usable for sidelink reception and correspond to a set of multiple active transmit beams of the first UE that are usable for sidelink transmission, select a set of multiple candidate resource sets associated respectively with the set of multiple active receive beams, based on monitoring sidelink transmissions with a set of multiple active receive beams, and transmit, to a second UE via an active transmit beam of the set of multiple active transmit beams, a sidelink message using one or more resources selected from a candidate resource set of the set of multiple candidate resource sets, where the candidate resource set is associated with an active receive beam corresponding to the active transmit beam.

In some examples of the methods, devices, and non-transitory computer-readable media described herein, monitoring sidelink transmissions with the set of multiple active receive beams may include operations, features, means, or instructions for monitoring sidelink transmissions with each of the set of multiple active receive beams for a respective time duration within the sensing window in accordance with an active receive beam sweeping pattern of the spatial sensing configuration.

In some examples of the methods, devices, and non-transitory computer-readable media described herein, monitoring sidelink transmissions with the set of multiple active receive beams may include operations, features, means, or instructions for performing, by a physical (PHY) layer of the first UE, two or more iterations of beam sweeping in accordance with the active receive beam sweeping pattern during the sensing window.

In some examples of the methods, devices, and non-transitory computer-readable media described herein, selecting the set of multiple candidate resource sets may include operations, features, means, or instructions for outputting to a medium access control (MAC) layer of the first UE, by a PHY layer of the first UE, an indication of at least a respective candidate resource set associated with one of the set of multiple active receive beams used for monitoring sidelink transmissions during the sensing window.

Some examples of the methods, devices, and non-transitory computer-readable media described herein may further include operations, features, means, or instructions for selecting, by a MAC layer of the first UE, the one or more resources from a candidate resource set associated with the active receive beam based on selection of the active transmit beam for transmission of the sidelink message.

In some examples of the methods, devices, and non-transitory computer-readable media described herein, monitoring sidelink transmissions with the set of multiple active receive beams may include operations, features, means, or instructions for outputting to a PHY layer of the first UE, by a MAC layer of the first UE, an indication of a respective active sensing window for each of the set of multiple active receive beams, where the respective active sensing window for the active receive beam includes a respective sidelink discontinuous reception (DRX) active time for the active transmit beam corresponding to the active receive beam and Monitoring sidelink transmissions by the PHY layer of the first UE with at least the active receive beam during the respective active sensing window for the active receive beam in accordance with an adaptive spatial sensing scheme of the spatial sensing configuration.

In some examples of the methods, devices, and non-transitory computer-readable media described herein, monitoring sidelink transmissions by the PHY layer of the first UE with at least the active receive beam may include operations, features, means, or instructions for monitoring sidelink transmissions with two or more active receive beams during a first active sensing window associated with a first active receive beam based on the first active sensing window of the first active receive beam overlapping with one or more active sensing windows associated with one or more active receive beams respectively.

In some examples of the methods, devices, and non-transitory computer-readable media described herein, monitoring sidelink transmissions with the two or more active receive beams may include operations, features, means, or instructions for monitoring sidelink transmissions with each of the two or more active receive beams for a respective time duration in accordance with the spatial sensing configuration of the first UE.

In some examples of the methods, devices, and non-transitory computer-readable media described herein, monitoring sidelink transmissions by the PHY layer of the first UE with at least the active receive beam may include operations, features, means, or instructions for monitoring sidelink transmissions with the active receive beam according to a respective transmission priority of the respective sidelink DRX active time for the active transmit beam corresponding to the active receive beam.

Some examples of the methods, devices, and non-transitory computer-readable media described herein may further include operations, features, means, or instructions for outputting, by the PHY layer of the first UE, an indication of the candidate resource set for the active receive beam based on one or more sidelink DRX active times that coincide with the respective active sensing window of the active receive beam.

Some examples of the methods, devices, and non-transitory computer-readable media described herein may further include operations, features, means, or instructions for selecting, by the MAC layer of the first UE, the one or more resources from the candidate resource set associated with the respective sidelink DRX active time of the active transmit beam corresponding to the active receive beam and transmitting the sidelink message to the second UE via the active transmit beam during the respective sidelink DRX active time using the one or more resources selected from the candidate resource set associated with the active receive beam.

In some examples of the methods, devices, and non-transitory computer-readable media described herein, monitoring sidelink transmissions with the set of multiple active receive beams may include operations, features, means, or instructions for transmitting, from a MAC layer of the first UE to a PHY layer of the first UE, a respective data indication prior to a respective sidelink DRX active time for each of the set of multiple active transmit beams corresponding to the set of multiple active receive beams and monitoring sidelink transmissions with the active receive beam of the set of multiple active receive beams according to the respective data indication from the MAC layer for the active transmit beam corresponding to the active receive beam.

In some examples of the methods, devices, and non-transitory computer-readable media described herein, a quantity of candidate resources associated with the at least one active receive beam may be less than a quantity of candidate resources associated with the active receive beam that may be used for monitoring during the sensing window.

In some examples of the methods, devices, and non-transitory computer-readable media described herein, the one or more resources selected for transmission of the sidelink message to the second UE may be within the respective sidelink DRX active time of the active transmit beam corresponding to the active receive beam.

Some examples of the methods, devices, and non-transitory computer-readable media described herein may further include operations, features, means, or instructions for outputting, by the PHY layer of the first UE, an indication of the candidate resource set associated with the active receive beam based on the respective data indication for the respective sidelink DRX active time of the active transmit beam corresponding to the active receive beam.

In some examples of the methods, devices, and non-transitory computer-readable media described herein, the respective data indication includes a data status indicator associated with the respective sidelink DRX active time, a quality of service (QoS) indicator associated with the respective sidelink DRX active time, or both.

In some examples of the methods, devices, and non-transitory computer-readable media described herein, the active transmit beam and the active receive beam of the first UE correspond to a same spatial direction or transmission configuration indicator (TCI) state with quasi-co-location (QCL) type-D.

Some examples of the methods, devices, and non-transitory computer-readable media described herein may further include operations, features, means, or instructions for allocating a quantity of time resources in the sensing window to the active receive beam based on a transmission priority or packet delay budget (PDB) of the respective sidelink DRX active time for the active transmit beam corresponding to the active receive beam, where the transmission priority or PDB may be indicated via the QoS indicator with the respective data indication associated with the respective sidelink DRX active time.

Some examples of the methods, devices, and non-transitory computer-readable media described herein may further include operations, features, means, or instructions for refraining from monitoring sidelink transmissions with at least one active receive beam of the set of multiple active receive beams based on a buffer status or data volume indicated via the data status indicator associated with the respective sidelink DRX active time of at least one active transmit beam corresponding to the at least one active receive beam.

DETAILED DESCRIPTION

Figure 1:
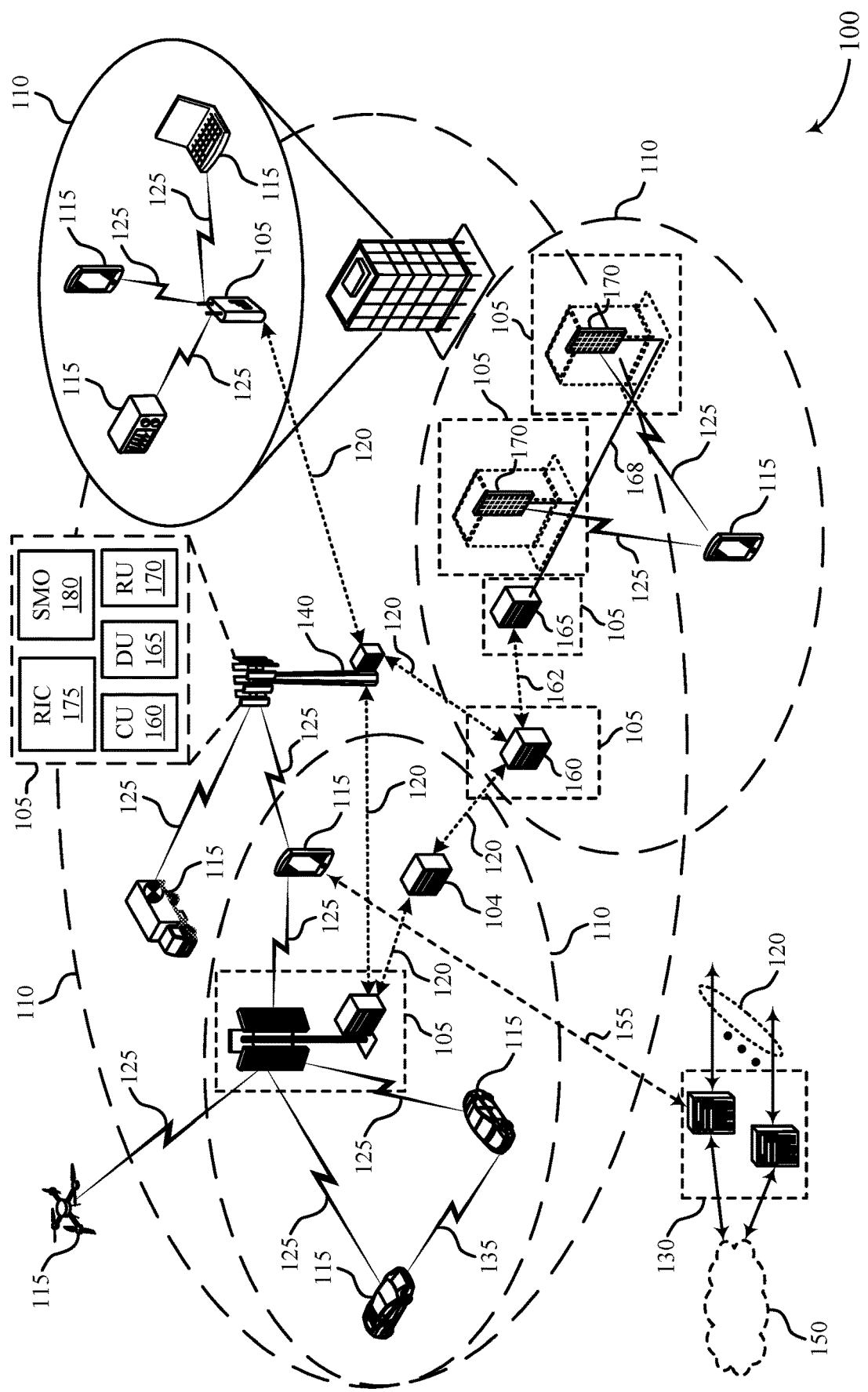
FIGS. 1 and 2 show examples of wireless communications systems that support spatial sensing techniques for sidelink communications in accordance with one or more aspects of the present disclosure.

In some wireless systems that support sidelink communications, a first user equipment (UE) may perform various sidelink beam management operations, including (but not limited to) initial beam-pairing, beam maintenance, beam failure recovery, etc. The first UE may use sidelink channel state information (CSI) and Uu beam management techniques to perform one or more of these sidelink beam management operations. For fifth generation (5G) new radio (NR) sidelink communications, the first UE may be configured to monitor for sidelink control information (SCI) from a second UE. The SCI may, in some cases, indicate a set of time-frequency resources the second UE has reserved for subsequent physical sidelink shared channel (PSSCH) transmissions. The first UE may decode the SCI broadcasted by the second UE and refrain from using the set of time-frequency resources reserved by the second UE.

For sidelink unicast transmissions, the first UE (e.g., a Tx UE) may use directional antennas to communicate with one or more second UEs (e.g., Rx UEs) in different spatial directions. As such, the first UE may sense and select resources for sidelink communications in multiple spatial directions. In some cases, however, the first UE may be unable (e.g., with analog beam forming) to sense sidelink transmissions using multiple receive beams (i.e., multiple spatial directions) at once (e.g., simultaneously, concurrently). Thus, if the first UE is sensing resources associated with a first receive beam (for sidelink transmissions from a second UE) in a first spatial direction, the first UE may be unable to sense resources associated with a second reception beam (for sidelink transmissions from a third UE) in a second spatial direction. Additionally, the position or orientation of the first UE may change relative to the second UE, which may cause the change of active transmit beam of the first UE (e.g., affecting the correspondence between the active transmit beam for transmission and the active receive beam for sensing at the first UE) and thus the reliability or accuracy of sensing operations at the first UE (e.g., using the active receive beam with the same spatial direction of or corresponding to the active transmit beam which may change due to the position or orientation change of the first UE).

In accordance with the techniques described herein, the first UE may be configured to perform spatial sensing with multiple active receive beams, each corresponding to a different spatial direction. The first UE may monitor sidelink transmissions with the active receive beams according to a spatial sensing configuration. In some implementations, the first UE may periodically monitor sidelink transmissions using each active receive beam for a set time duration, in accordance with a beam sweeping pattern. In other implementations, the first UE may choose or select which active receive beam(s) to monitor based on a sidelink discontinuous reception (DRX) schedule or configuration of the first UE. For example, if the first UE intends to use a particular transmit beam during an upcoming sidelink DRX active time, the first UE may increase the frequency or duration for which the first UE monitors (e.g., senses) sidelink transmissions using an active receive beam associated with the transmit beam.

After monitoring sidelink transmissions using the active receive beams in accordance with the spatial sensing configuration, the first UE may identify or select a suitable set of candidate resources for each active receive beam (i.e., spatial direction). For example, a physical (PHY) layer of the first UE may output, to a medium access control (MAC) layer of the first UE, an indication of at least one respective candidate resource set for each of the active receive beams monitored during the sensing window. Accordingly, if the first UE determines to transmit a sidelink message in a given spatial direction (e.g., using a particular transmit beam), the first UE may select one or more resources from a candidate resource set associated with an active receive beam corresponding to the given spatial direction (e.g., with the spatial direction of or corresponding to the particular transmit beam or the active transmit beam), and may transmit the sidelink message at the selected resources using the particular transmit beam. The techniques described herein may enable the first UE to perform sidelink spatial sensing with greater efficiency, improved accuracy, and lower processing overhead, among other benefits.

Aspects of the disclosure are initially described in the context of wireless communications systems, resource diagrams, and process flows. Aspects of the disclosure are further illustrated by and described with reference to apparatus diagrams, system diagrams, and flowcharts that relate to spatial sensing techniques for sidelink communications.

FIG. 1 shows an example of a wireless communications system 100 that supports spatial sensing techniques for sidelink communications in accordance with one or more aspects of the present disclosure. The wireless communications system 100 may include one or more network entities 105, at least one UE 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof.

An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., PHY layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor.

An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support spatial sensing techniques for sidelink communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation.

A UE 115 may be configured with multiple downlink component carriers and one or more uplink component carriers according to a carrier aggregation configuration. Carrier aggregation may be used with both frequency division duplexing (FDD) and time division duplexing (TDD)

component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner.

An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, at least one UE 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, at least one UE 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions.

In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In accordance with aspects of the present disclosure, a first UE 115 monitor sidelink transmissions during a sensing window using multiple active receive beams in accordance with a spatial sensing configuration. The multiple active receive beams may be usable for sidelink reception, and may correspond to multiple active transmit beams that are usable for sidelink transmission. The first UE 115 may select multiple candidate resource sets associated respectively with the multiple active receive beams based on monitoring sidelink transmissions using the multiple active receive beams. The first UE may transmit, to a second UE 115, using an active transmit beam of the multiple active transmit beams, a sidelink message via one or more resources selected from a candidate resource set of the multiple candidate resource sets. The candidate resource set may be associated with an active receive beam corresponding to (e.g., with the same spatial direction of) the active transmit beam.

Figure 2:
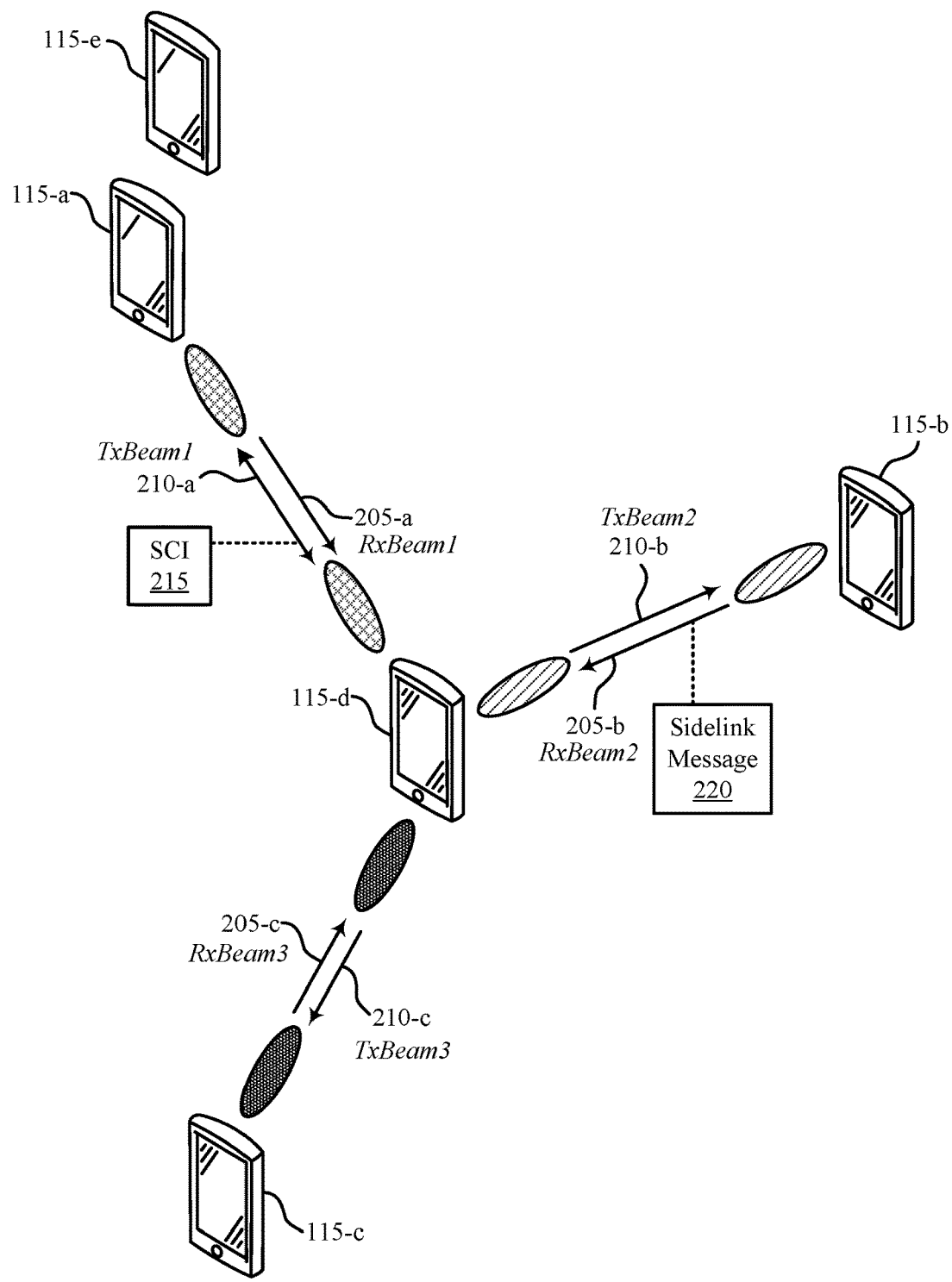

FIG. 2 shows an example of a wireless communications system 200 that supports spatial sensing techniques for sidelink communications in accordance with one or more aspects of the present disclosure. The wireless communications system 200 may implement one or more aspects of the wireless communications system 100. For example, the wireless communications system 200 includes a UE 115-*a*, a UE 115-*b*, a UE 115-*c*, and a UE 115-*d*, which may be examples of corresponding devices shown and described with reference to FIG. 1. In the wireless communications system 200, the UE 115-*d* may perform sidelink spatial sensing using an active receive beam 205-*a* (e.g., RxBeam1) corresponding (e.g., same spatial direction, or TCI state with QCL type D) to an active transmit beam 210-*a* (e.g., TxBeam1), an active receive beam 205-*b* (e.g., RxBeam2) corresponding to an active transmit beam 210-*b* (e.g., TxBeam2), and an active receive beam 205-*c* (e.g., RxBeam3) corresponding to an active transmit beam 210-*c* (e.g., TxBeam3) in different spatial directions associated with different peer UEs (e.g., UE 115-*a*, UE 115-*b*, and UE 115-*c*) for sidelink communications.

As shown in the example of FIG. 2, a spatial direction associated with the active receive beam 205-*a* (e.g., RxBeam1) may correspond to an active transmit beam 210-*a* (e.g., TxBeam1), a spatial direction associated with the active receive beam 205-*b* (e.g., RxBeam2) may correspond to an active transmit beam 210-*b* (e.g., TxBeam2), and a spatial direction associated with the active receive beam 205-*c* (e.g., RxBeam3) may correspond to an active transmit beam 210-*c* (e.g., TxBeam3). As described herein, an "active receive beam" refers to a receive beam (such as an antenna array configuration for signal reception in a particular spatial direction) that is currently available to receive signals from other devices. Likewise, an "active transmit beam" refers to a transmit beam (such as an antenna array configuration for signal transmission in a particular spatial direction) that is currently available to transmit signals to other devices.

In the wireless communications system 200, the UE 115-d may perform various sidelink beam management operations, including (but not limited to) initial beam-pairing, beam maintenance, beam failure recovery, etc. The UE 115-d may use sidelink CSI-RS and other Uu beam management techniques to perform one or more of these sidelink beam management operations. For 5G NR sidelink communications, for example, the UE 115-d may be configured to monitor for SCI 215 from at least one other UE 115-e in the same spatial direction as the sidelink communication with the peer UE 115-a (e.g., near or collocated with the peer UE 115-a). The SCI 215 may, in some cases, indicate a set of time-frequency resources the at least one other UE 115-e (e.g., in the same spatial direction as the peer UE 115-a) has reserved for subsequent PSSCH transmissions. The UE 115-d may decode the SCI 215 from the at least one other UE 115-e and refrain from using the set of time-frequency resources reserved by the at least one other UE 115-e for sidelink transmission(s) to be received by the peer UE 115-a to avoid interference.

For sidelink unicast transmissions, the UE 115-d may use directional antennas to communicate with peer UEs 115 in different spatial directions. As such, the UE 115-d may have to sense and select resources for sidelink communications in multiple spatial directions. In some cases, however, the UE 115-d may be unable to sense multiple active receive beams (corresponding to multiple spatial directions) at once (e.g., simultaneously, concurrently). Thus, if the UE 115-d is sensing resources associated with the active receive beam 205-a corresponding to active transmit beam 210-a (for sidelink transmissions from the UE 115-d to the peer UE 115-a), the first UE (UE 115-d) may be unable to sense resources associated with the active receive beam 205-b or the active receive beam 205-c. Also, the position or orientation of the UE 115-d or the peer UE 115-a may change which may cause the change of active transmit beam of the UE 115-d for sidelink communication with peer UE 115-a (e.g., affecting the correspondence between the active transmit beam for transmission and the active receive beam for sensing at the first UE), which could affect the reliability and/or accuracy of sensing operations at the UE 115-d.

In accordance with the techniques described herein, the UE 115-d may be configured to conduct spatial sensing with multiple active receive beams, each corresponding to a different spatial direction. The UE 115-d may monitor sidelink transmissions using the active receive beams according to a spatial sensing configuration. In some implementations, the UE 115-d may periodically monitor sidelink transmissions using each of the active receive beams for a set time duration, in accordance with a beam sweeping pattern. In other implementations, the UE 115-d may choose or select which active receive beams to monitor based on a sidelink DRX schedule (or DRX configuration) between the UE 115-d and peer UE 115-a, peer UE 115-b, or peer UE 115-c. For example, if the UE 115-d intends to use the active transmit beam 210-b during an upcoming sidelink DRX active time of peer UE 115-b, the UE 115-d may increase the frequency or duration of sensing for which the UE 115-d monitors (e.g., senses) sidelink transmissions using the active receive beam 205-b associated with the active transmit beam 210-b for sidelink transmissions to peer UE 115-b during the sidelink DRX active time of peer UE 115-b.

After monitoring the active receive beams in accordance with the spatial sensing configuration, the UE 115-d may identify a suitable candidate resource set for each active receive beam (i.e., spatial direction). For example, a PHY layer of the UE 115-d may output, to a MAC layer of the UE 115-d, an indication of at least one respective candidate resource set for each of the active receive beams monitoring sidelink transmissions during the sensing window. Accordingly, if/when the UE 115-d determines to transmit a sidelink message 220 in a particular spatial direction (e.g., using the active transmit beam 210-b corresponding to the active receive beam 205-b), the UE 115-d may select one or more resources of a candidate resource set associated with the active receive beam 205-b, and may use the selected resources to transmit the sidelink message 220 via the active transmit beam 210-b. The techniques described herein may enable the UE 115-d to perform sidelink spatial sensing with greater efficiency, improved accuracy, and lower processing overhead, among other benefits.

Figure 3:
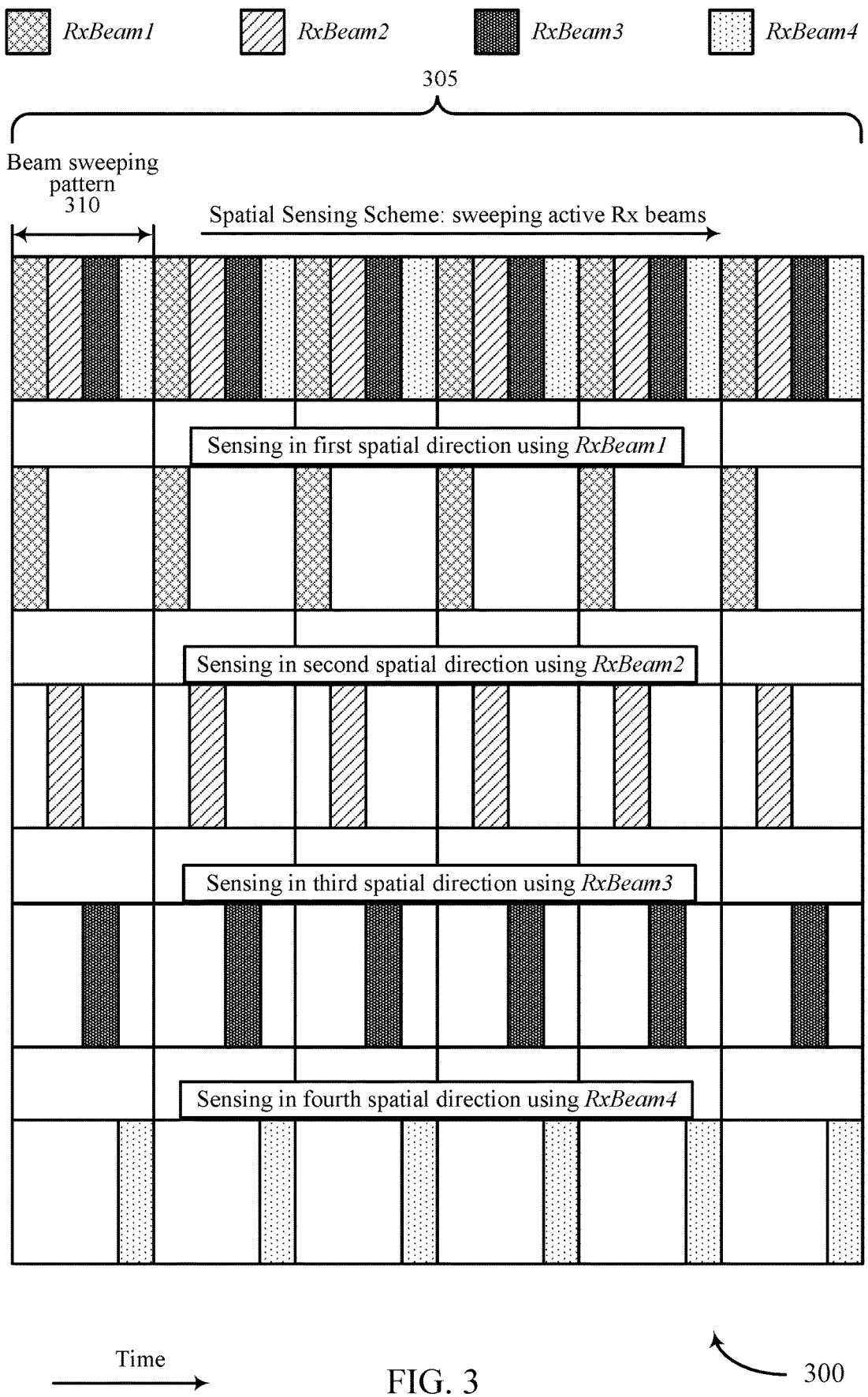
FIGS. 3 through 5 show examples of resource diagrams that support spatial sensing techniques for sidelink communications in accordance with one or more aspects of the present disclosure.

FIG. 3 shows an example of a resource diagram 300 that supports spatial sensing techniques for sidelink communications in accordance with one or more aspects of the present disclosure. The resource diagram 300 may implement one or more aspects of the wireless communications system 100 and/or the wireless communications system 200. For example, the resource diagram 300 includes an active receive beam 205-a (referred to hereinafter as RxBeam1) corresponding to an active transmit beam 210-a (referred to hereinafter as TxBeam1), an active receive beam 205-b (referred to hereinafter as RxBeam2) corresponding to an active transmit beam 210-b (referred to hereinafter as TxBeam2), an active receive beam 205-c (referred to hereinafter as RxBeam3) corresponding to an active transmit beam 210-c (referred to hereinafter as TxBeam3), and a fourth active receive beam (referred to hereinafter as RxBeam4) corresponding to a fourth active transmit beam (referred to hereinafter as TxBeam4), which may be examples of corresponding elements shown and described with reference to FIG. 2.

As described herein, some wireless communications systems may support sidelink operations in Frequency Range 2 (FR2), which includes frequency bands from approximately 24.25 GHz to 52.6 GHz. Examples of sidelink operations include NR sidelink operations in the FR2 licensed spectrum. Some systems may support sidelink beam management (including initial beam-pairing, beam maintenance, and beam failure recovery) by using current sidelink CSI-RS framework and Uu beam management techniques for sidelink unicast communications.

Some wireless communications systems may support NR sidelink communications, including NR SCI. First-stage SCI, which is transmitted via a physical sidelink control channel (PSCCH), may indicate time-frequency resources reserved for future PSSCH transmissions. SCI can span 2 symbols (known as 2-symbol SCI) or 3 symbols (known as 3-symbol SCI). For semi-persistent scheduling (SPS), a Resource Reservation Period field of the SCI may indicate a time interval for periodic transmissions in the future. In resource allocation mode 2, NR sidelink sensing is used for resource selection. For example, a Tx UE may broadcast its reserved resources in SCI (for example, via a PSCCH transmitted with a sidelink transmission on PSSCH). Other Tx UEs conducting sensing for resource selection may decode the broadcasted SCI (e.g., via a PSCCH) and exclude the resources reserved by the Tx UE.

In some cases, a Tx UE (such as the UE 115-d shown and described with reference to FIG. 2) maintains a sensing window 305 (such as a sliding time interval) for continuously sensing using an omni-antenna and a candidate resource set based on the omnidirectional sensing in the sensing window 305. Thereafter, the Tx UE selects different resources for transmitting transport blocks (TBs) on PSSCH to different Rx UEs (such as the UE 115-b shown and described with reference to FIG. 2) from the candidate resource set, which is determined without spatial filtering (omnidirectional sensing). However, for sidelink unicast transmissions in FR2 (also referred to as millimeter wave), a Tx UE may communicate with multiple Rx UEs using directional antennas that correspond to different spatial directions. As such, the Tx UE may have to sense and select resources for sidelink communications in multiple spatial directions. For example, the Tx UE may have to sense and select resources using RxBeam1 which corresponds to Tx Beam 1 for transmitting one or more TBs to a first Rx UE, and the Tx UE may have to sense and select resources using RxBeam2 which corresponds to Tx Beam 2 for transmitting one or more TBs to a second Rx UE.

As such, the resources sensed by the Tx UE may be spatially filtered with different receive beams. Using current sensing mechanisms, if the Tx UE senses resources with RxBeam1 corresponding to Tx Beam 1 for the transmissions to the first Rx UE, the Tx UE may be unable to sense resources with RxBeam2 corresponding to Tx Beam 2 for transmissions to the second Rx UE. Additionally, the active receive/transmit beam of the Tx UE may change relative to the transmit/receive beam of the Rx UE due to mobility or rotation of the Tx UE or the Rx UE. Thus, it may be desirable to enhance some aspects of current resource sensing and selection mechanisms. Aspects of the present disclosure generally provide for sensing efficiently with different receive beams to support communications with different Rx UEs for sidelink FR2 operations.

The techniques described herein support spatial sensing with multiple active receive beams. In the example of FIG. 3, the Tx UE may conduct spatial sensing using multiple active receive beams, where the active receive beams correspond to active transmit beams used for transmitting different TBs to different Rx UEs. For example, a PHY layer of the Tx UE may conduct spatial sensing in multiple active spatial directions by sweeping one or more active receive beams within a sensing window 305, which moves along in time. In other words, the Tx UE may repeatedly sweep RxBeam1, RxBeam2, RxBeam3, and RxBeam4 according to a beam sweeping pattern 310.

The PHY layer of the Tx UE may provide multiple candidate resource sets associated with the multiple spatial directions based on the special sensing (e.g., candidate resource sets associated respectively with RxBeam1, RxBeam2, RxBeam3, and RxBeam4). A MAC layer of the Tx UE may select one or more resources for a sidelink transmission from a candidate resource set associated with the spatial direction of the sidelink transmission. For example, the Tx UE may select resources from the candidate resource set associated with RxBeam1 for transmissions to the first Rx UE using TxBeam1, and may select resources from the candidate resource set associated with RxBeam2 for transmissions to the second Rx UE using TxBeam2.

Figure 4:
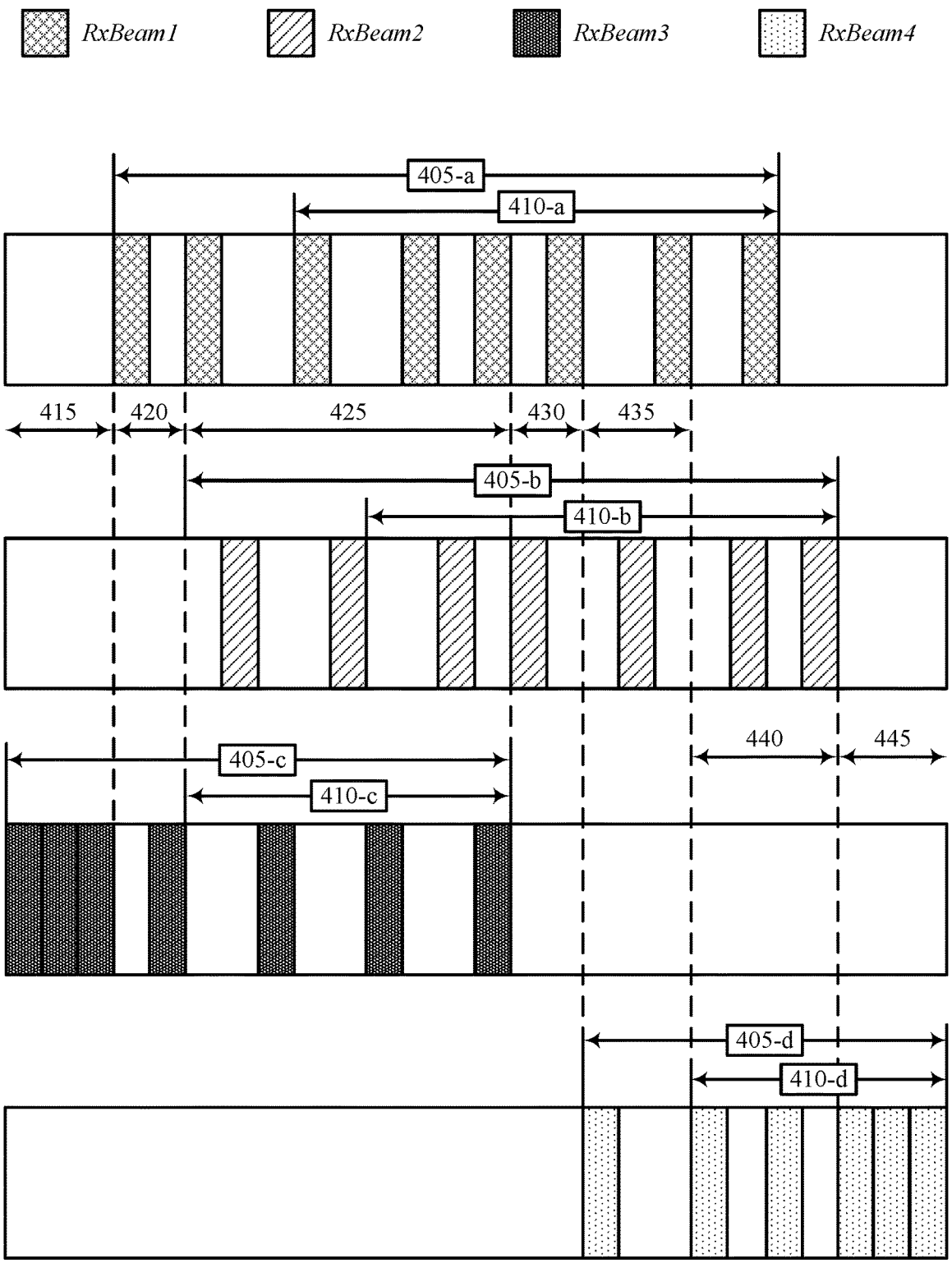

FIG. 4 shows an example of a resource diagram 400 that supports spatial sensing techniques for sidelink communications in accordance with one or more aspects of the present disclosure. The resource diagram 400 may implement one or more aspects of the wireless communications system 100, the wireless communications system 200, and/or the resource diagram 300. For example, the resource diagram 400 includes an active receive beam 205-a (referred to hereinafter as RxBeam1) corresponding to an active transmit beam 210-a (referred to hereinafter as TxBeam1), an active receive beam 205-b (referred to hereinafter as RxBeam2) corresponding to an active transmit beam 210-b (referred to hereinafter as TxBeam2), an active receive beam 205-c (referred to hereinafter as RxBeam3) corresponding to an active transmit beam 210-c (referred to hereinafter as TxBeam3), and a fourth active receive beam (referred to hereinafter as RxBeam4) corresponding to a fourth active transmit beam (referred to hereinafter as TxBeam4), which may be examples of corresponding elements shown and described with reference to FIG. 2.

The resource diagram 400 illustrates an example of an adaptive spatial sensing scheme used by a Tx UE, such as the UE 115-d shown and described with reference to FIG. 2. In the example of FIG. 4, the Tx UE may conduct adaptive spatial sensing based on one or more sidelink DRX active times. A MAC layer of the Tx UE may indicate to a PHY layer of the Tx UE multiple active sensing windows respectively associated with multiple sidelink DRX active times. For example, the MAC layer of the TX UE may indicate an active sensing window 405-a for RxBeam1, an active sensing window 405-b for RxBeam2, an active sensing window 405-c for RxBeam3, and an active sensing window 405-d for RxBeam4.

The active sensing window 405-a for sensing using RxBeam1 may include a sidelink DRX active time 410-a (SL_DRX1) for sidelink transmissions using TxBeam1, the active sensing window 405-b for sensing using RxBeam2 may include a sidelink DRX active time 410-b (SL_DRX2) for sidelink transmissions using TxBeam2, the active sensing window 405-c for sensing using RxBeam3 may include a sidelink DRX active time 410-c (SL_DRX3) for sidelink transmissions using TxBeam3, and the active sensing window 405-d for sensing using RxBeam4 may include a sidelink DRX active time 410-d (SL_DRX4) for sidelink transmissions using TxBeam4. The PHY layer of the Tx UE may provide multiple candidate resource sets with multiple active receive beams based on the respective sidelink DRX active times (e.g., candidate resource sets associated respectively with SL_DRX1, SL_DRX2, SL_DRX3 and SL_DRX4).

If two or more of the active sensing windows overlap in time, the Tx UE may conduct spatial sensing with the respective two or more active receive beams to sense evenly. Alternatively, the Tx UE may conduct spatial sensing with the respective two or more active receive beams based on respective transmission priorities during the corresponding sidelink DRX active times, where more sensing opportunities are allocated to higher priority or low latency transmissions. In the example of FIG. 4, the Tx UE may sense using RxBeam3 during an interval 415 of the active sensing window 405-c that does not overlap with other sensing windows. The Tx UE may sense using RxBeam1 and RxBeam3 during an interval 420 of overlap between the active sensing window 405-a and the active sensing window 405-c. The Tx UE may sense using RxBeam1, RxBeam2, and RxBeam3 during an interval 425 of overlap between the active sensing window 405-a, the active sensing window 405-b, and the active sensing window 405-c.

The Tx UE may sense using RxBeam1 and RxBeam2 during an interval 430 of overlap between the active sensing window 405-a and the active sensing window 405-b. The Tx UE may sense using RxBeam1, RxBeam2, and RxBeam4 during an interval 435 of overlap between the active sensing window 405-a, the active sensing window 405-b, and the active sensing window 405-d. The Tx UE may sense using RxBeam2 and RxBeam4 during an interval 440 of overlap between the active sensing window 405-b and the active sensing window 405-d. The Tx UE may sense using RxBeam4 during an interval 445 of the active sensing window 405-d that does not overlap with other sensing windows.

Accordingly, the MAC layer of the Tx UE may select one or more resources (for a sidelink transmission) from the candidate resource set that is within a respective sidelink DRX active time for the designated active transmit beam. For example, the MAC layer of the Tx UE may select resources from the candidate resource set within SL_DRX1 for sidelink transmissions to a first Rx UE (such as the UE 115-a shown and described with reference to FIG. 2) using TxBeam1. Likewise, the Tx UE may select resources from the candidate resource set within SL_DRX2 for sidelink transmissions to a second Rx UE (such as the UE 115-b shown and described with reference to FIG. 2) using TxBeam2.

Figure 5:
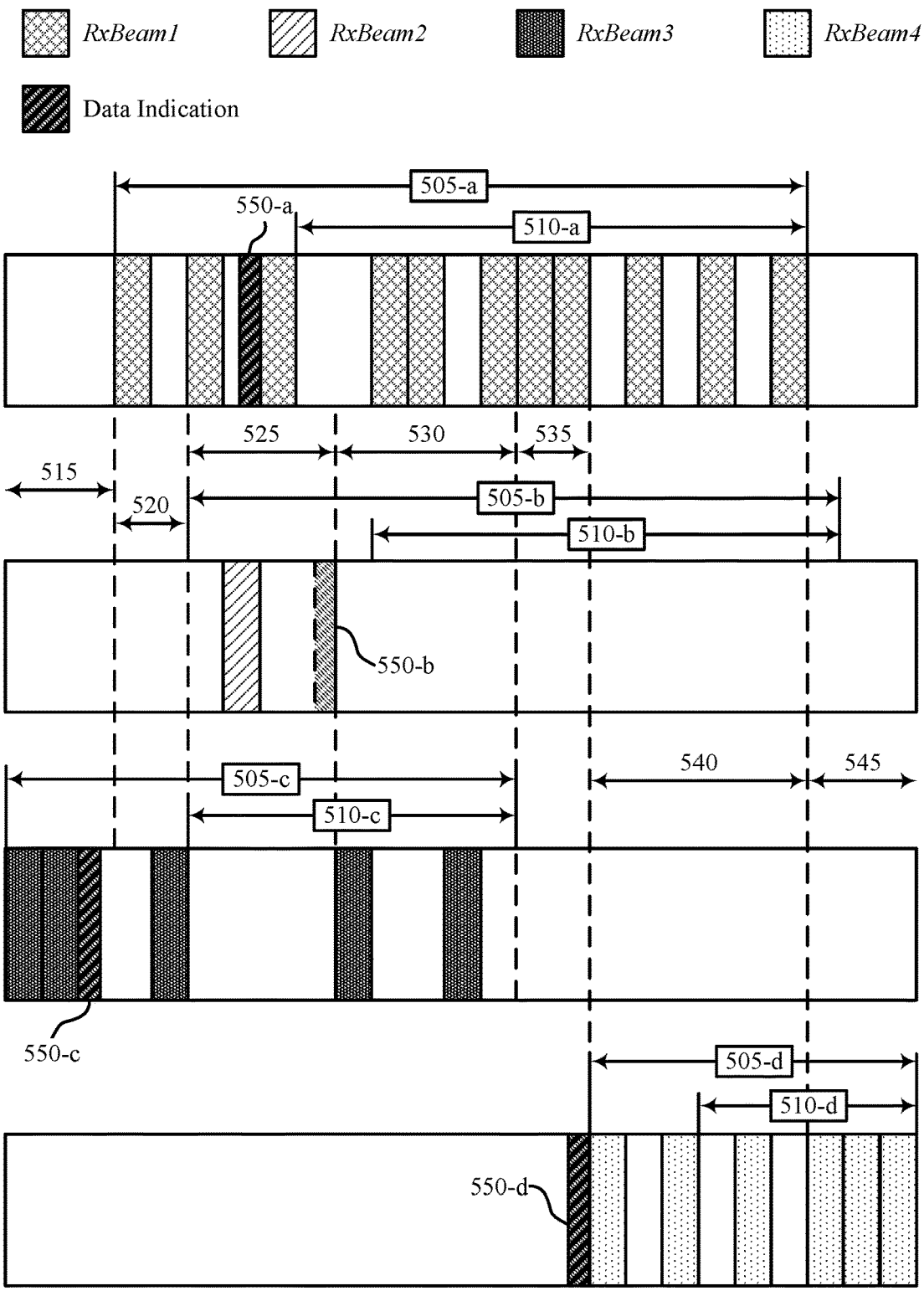

FIG. 5 shows an example of a resource diagram 500 that supports spatial sensing techniques for sidelink communications in accordance with one or more aspects of the present disclosure. The resource diagram 500 may implement one or more aspects of the wireless communications systems and/or resource diagrams shown and described with reference to FIGS. 1 through 4. For example, the resource diagram 500 includes an active receive beam 205-a (referred to hereinafter as RxBeam1) corresponding to an active transmit beam 210-a (referred to hereinafter as TxBeam1), an active receive beam 205-b (referred to hereinafter as RxBeam2) corresponding to an active transmit beam 210-b (referred to hereinafter as TxBeam2), an active receive beam 205-c (referred to hereinafter as RxBeam3) corresponding to an active transmit beam 210-c (referred to hereinafter as TxBeam3), and a fourth active receive beam (referred to hereinafter as RxBeam4) corresponding to a fourth active transmit beam (referred to hereinafter as TxBeam4), which may be examples of corresponding elements shown and described with reference to FIG. 2.

The resource diagram 500 illustrates an example of an adaptive spatial sensing scheme used by a Tx UE, such as the UE 115-d shown and described with reference to FIG. 2. In the example of FIG. 5, the Tx UE may conduct adaptive spatial sensing based on a data indication with data status information (e.g., a volume of data in a buffer of the Tx UE to be transmitted) and QoS information such as transmission priority, packet delay budget (PDB), etc. associated with the data to be transmitted. A MAC layer of the Tx UE may provide to a PHY layer of the Tx UE a data indication prior to each sidelink DRX active time of multiple sidelink DRX active times. For example, the MAC layer of the TX UE may provide a first data indication 550-a (DataInd1) prior to a sidelink DRX active time 510-a (SL_DRX1), a second data indication 550-b (DataInd2) prior to a sidelink DRX active time 510-b (SL_DRX2), a third data indication 550-c (DataInd3) prior to a sidelink DRX active time 510-c (SL_DRX3), and a fourth data indication 550-d (DataInd4) prior to a sidelink DRX active time 510-d (SL_DRX4).

The sidelink DRX active time 510-a may be a part of an active sensing window 505-a associated with RxBeam1, the sidelink DRX active time 510-b may be a part of an active sensing window 505-b associated with RxBeam2, the sidelink DRX active time 510-c may be a part of an active sensing window 505-c associated with RxBeam3, and sidelink DRX active time 510-d may be a part of an active sensing window 505-d associated with RxBeam4. The PHY layer of the Tx UE may provide multiple candidate resource sets with multiple active reception beams based on the data indications associated with the respective sidelink DRX active times (e.g., candidate resource sets associated respectively with SL_DRX1, SL_DRX2, SL_DRX3 and SL_DRX4). In some implementations, the Tx UE may allocate more sensing opportunities for sidelink DRX active times with a higher transmission priority or a short PDB (as indicated by the respective data indications) based on the QoS information contained in the data indication. Likewise, the Tx UE may allocate fewer sensing opportunities for sidelink DRX active times with a lower transmission priority (as indicated by the respective data indications).

If no data indication is provided or a data indication signals an absence of data to be transmitted (e.g., the data indication 550-b (DataInd2) provided prior to SL_DRX2), spatial sensing in the associated active sensing window may be reduced or omitted. As such, fewer or no candidate resources may be provided for these active receive beams. If two or more of the active sensing windows overlap in time, the Tx UE may conduct spatial sensing with the respective two or more active receive beams to sense evenly. Alternatively, the Tx UE may conduct spatial sensing with the respective two or more active receive beams based on respective transmission priorities during the corresponding sidelink DRX active times, where more sensing opportunities are allocated to higher priority transmissions. In the example of FIG. 5, the Tx UE may sense using RxBeam3 during an interval 515 of the active sensing window 505-c that does not overlap with other sensing windows. If the data indication 550-c (DataInd3 provided before SL_DRX3) indicates a presence of data with low priority to be transmitted using TxBeam3, the Tx UE may sense using RxBeam1 and RxBeam3 during an interval 520 of overlap between the active sensing window 505-a and the active sensing window 505-c.

If the data indication 550-a (DataInd1) indicates a high transmission priority using TxBeam1, the Tx UE may allocate more sensing opportunities to RxBeam1 during the remaining active sensing window 505-a (e.g., after the data indication 550-a). The Tx UE may sense using RxBeam1 and RxBeam2 (with less or no sensing opportunities to RxBeam3) during an interval 525 of overlap between the active sensing window 505-a and the active sensing window 505-b and the active sensing window 505-c. If the data indication 550-b (DataInd2 provided before SL_DRX2) is not presented or indicates an absence of data to be transmitted using TxBeam2, the Tx UE may refrain from sensing (i.e., monitoring) using RxBeam2 during the remaining active sensing window 505-b (e.g., after the data indication 550-b if presented). The Tx UE may sense using RxBeam1 and RxBeam3 (no sensing using RxBeam2) during an interval 530 of overlap between the active sensing window 505-a and the active sensing window 505-b and the active sensing window 505-c. The Tx UE may sense using RxBeam1 (no sensing using RxBeam2) during an interval 535 of overlap between the active sensing window 505-a and the active sensing window 505-b. If the data indication 550-d (DataInd4 provided before SL_DRX4) indicates a presence of data (e.g., with same priority as indicated via data indication 550-a) to be transmitted using TxBeam4, the Tx UE may sense using RxBeam1 and RxBeam4 evenly during an interval 540 of overlap between the active sensing window 505-a and the active sensing window 505-d. The Tx UE may sense using RxBeam4 during an interval 545 of the active sensing window 505-*d* that does not overlap with other sensing windows.

Accordingly, the MAC layer of the Tx UE may select one or more resources (for a sidelink transmission) from the candidate resource set that is within a respective sidelink DRX active time for the designated active transmit beam. For example, the MAC layer of the Tx UE may select resources from the candidate resource set within SL_DRX1 active time for sidelink transmissions to a first Rx UE (such as the UE 115-*a* shown and described with reference to FIG. 2) using TxBeam1. Likewise, the Tx UE may select resources from the candidate resource set within SL_DRX2 active time for sidelink transmissions to a second Rx UE (such as the UE 115-*b* shown and described with reference to FIG. 2) using TxBeam2.

Figure 6:
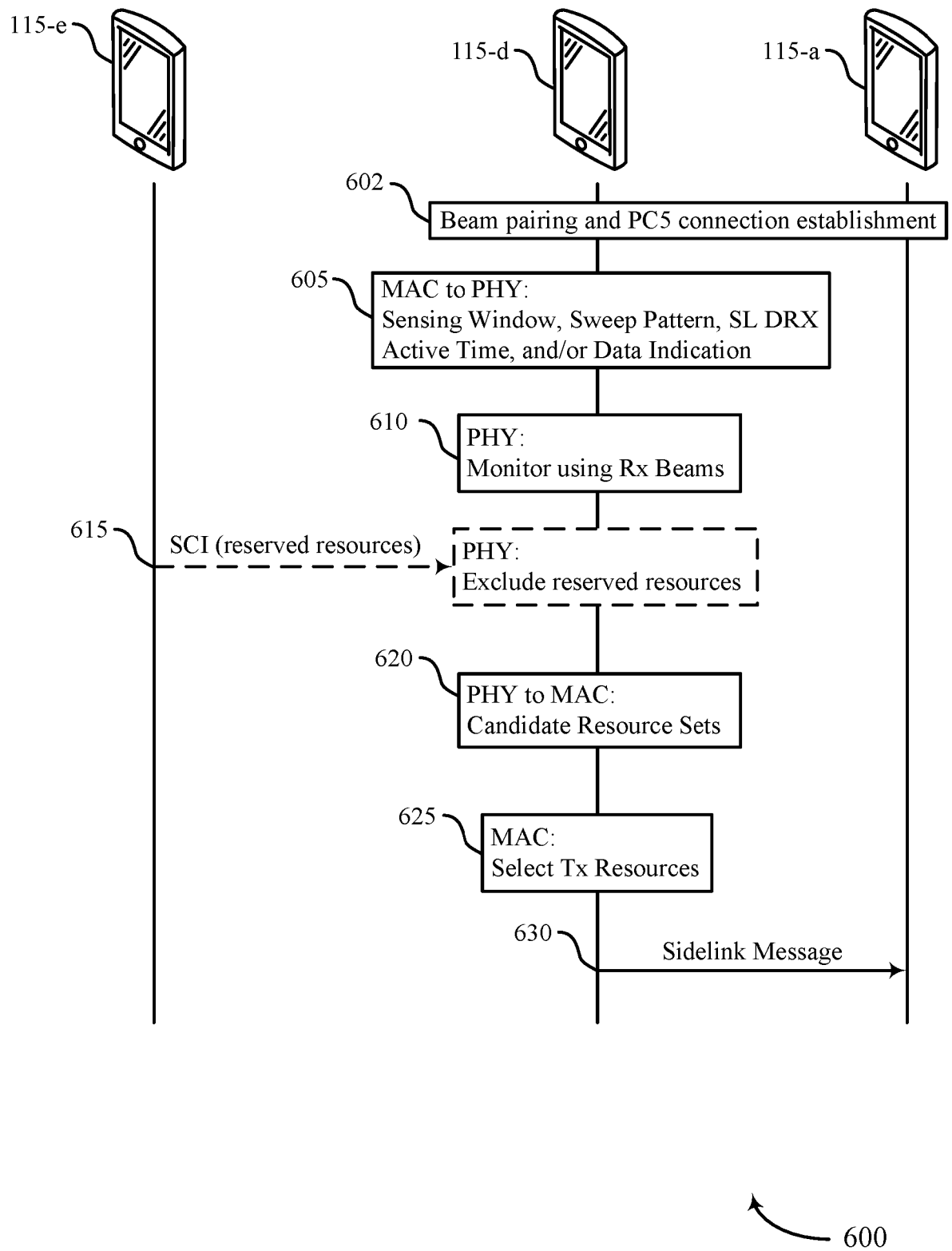
FIG. 6 shows an example of a process flow that supports spatial sensing techniques for sidelink communications in accordance with one or more aspects of the present disclosure.

FIG. 6 shows an example of a process flow 600 that supports spatial sensing techniques for sidelink communications in accordance with one or more aspects of the present disclosure. The process flow 600 may implement one or more aspects of the wireless communications systems and/or resource diagrams shown and described with reference to FIGS. 1 through 5. For example, the process flow 600 includes a UE 115-*a* (e.g., an Rx UE or a peer UE), a UE 115-*d* (e.g., a Tx UE), and a UE 115-*e* (e.g., an other Tx UE), which may be examples of corresponding devices shown and described with reference to FIG. 2. In the following description of the process flow 600, operations between the UE 115-*a*, the UE 115-*d*, and the UE 115-*e* may be added, omitted, or performed in a different order (with respect to the exemplary order shown).

At 602, UE 115-*d* and UE 115-*a* have conducted beam pairing (e.g., initial beam forming with UE115-*d*'s active transmit beam TxBeam1 paired with UE115-*a*'s active receive beam for sidelink transmissions to the UE 115-*a* shown and described with reference to FIG. 2) and established PC5 connection for a unicast (e.g., UE 115-*d* has configured SL_DRX1 for transmissions to UE 115-*a* during the PC5 connection establishment procedure).

In some examples, at 605, a MAC layer of the UE 115-*d* may output, to a PHY layer of the UE 115-*d*, a data indication associated with a sidelink DRX active time for an active transmit beam (e.g., TxBeam1) of the UE 115-*d*. The data indication may include a data status indicator and/or a QoS indicator associated with the data transmissions during the sidelink DRX active time. In some implementations, the UE 115-*d* may allocate a quantity of time resources for sensing within a sensing window (such as the sensing window 305 shown and described with reference to FIG. 3) using the active receive beam (e.g., RxBeam1 corresponding to the active transmit beam TxBeam1) based on a transmission priority or PDB of the respective data to be transmitted during the sidelink DRX active time using the active transmit beam corresponding to the active receive beam for sensing.

At 610, the UE 115-*d* may monitor sidelink transmissions during the sensing window using the active receive beam (e.g., active receive beam 205-*a*) or using multiple active receive beams (such as the active receive beams shown and described with reference to FIG. 2) if the sensing window overlaps with other sensing windows (such as the interval 425 shown and described with reference to FIG. 4) in accordance with a spatial sensing configuration of the first UE. As described herein, the multiple active receive beams of the UE 115-*d* may be usable (e.g., activated) for sidelink reception, and may correspond to (e.g., same spatial direction or same TCI state with QCL type D) multiple active transmit beams of the UE 115-*d* that are usable for sidelink transmission. In some implementations, the UE 115-*d* may monitor sidelink transmissions using each active receive beam for a respective time duration within the sensing window in accordance with an active receive beam sweeping pattern of the spatial sensing configuration. For example, the PHY layer of the UE 115-*d* may perform two or more iterations of beam sweeping in accordance with the active receive beam sweeping pattern during the sensing window.

In other implementations, the MAC layer of the UE 115-*d* may output, to the PHY layer of the UE 115-*d*, an indication of a respective active sensing window for each active receive beam for sensing within the active sensing window, where the respective active sensing window includes a respective sidelink DRX active time for an active transmit beam (corresponding to the active receive beam for sensing) for transmissions during the sidelink DRX active time. Accordingly, the PHY layer of the UE 115-*d* may monitor (sense) sidelink transmissions using at least the active receive beam during the respective active sensing window for the active receive beam in accordance with an adaptive spatial sensing scheme. In other implementations, the PHY layer of the UE 115-*d* may monitor sidelink transmissions using one or more of the active receive beams according to the data indication(s) received from the MAC layer of the UE 115-*d* at 605. In some examples, the PHY layer of the UE 115-*d* may refrain from monitoring sidelink transmissions using at least one active receive beam of the multiple active receive beams based on a buffer status or data volume indicated by the data status indicator included in the data indication prior to the respective sidelink DRX active time using an active transmit beam corresponding to the at least one active receive beam for sensing.

In some examples, at 615, the UE 115-*d* may receive SCI (such as the SCI 215 shown and described with reference to FIG. 2) from the UE 115-*e* based on monitoring sidelink transmissions using the multiple active receive beams in accordance with the spatial sensing configuration of the UE 115-*d*. As described herein, the SCI may indicate a set of one or more time-frequency resources the UE 115-*e* has reserved for future PSSCH transmissions. At 620, the PHY layer of the UE 115-*d* may output, to the MAC layer of the UE 115-*d*, an indication of at least one respective candidate resource set for each of the multiple active receive beams used for monitoring sidelink transmissions during the sensing window. In some implementations, the respective candidate resource sets may exclude the one or more time-frequency resources reserved by the UE 115-*e*. In some implementations, the respective candidate resource sets may not exclude the one or more time-frequency resources reserved by the UE 115-*e* (e.g., if the RSRP measurements of UE 115-*e*'s transmissions are below a threshold). In some implementations, the respective candidate resource sets may exclude the one or more time-frequency resources based on the pattern of measurement (e.g., the pattern of measured RSSI).

At 625, the MAC layer of the UE 115-*d* may select one or more resources from a candidate resource set sensed and selected with an active receive beam corresponding to an active transmit beam of the UE 115-*d* (such as the active transmit beam 210-*a* used for transmissions to UE 115-*a* shown and described with reference to FIG. 2). In particular, the MAC layer of the UE 115-*d* may output, to the PHY layer of the UE 115-*d*, an indication of the one or more resources selected from the candidate resource set of the corresponding active receive beam. In some implementations, the one or more resources selected by the MAC layer of the UE 115-d may be within a sidelink DRX active time associated with the active transmit beam.

At 630, the UE 115-d may transmit a sidelink message (such as the sidelink message 220 shown and described with reference to FIG. 2) to the UE 115-a using the active transmit beam. The PHY layer of the UE 115-d may transmit the sidelink message to the UE 115-a via the one or more resources selected by the MAC layer from the candidate resource set of the active receive beam corresponding to the active transmit beam. In some implementations, the UE 115-d may transmit the sidelink message during the sidelink DRX active time associated with the active transmit beam.

In some aspects, a UE may transmit or receive with multiple beams simultaneously (e.g., a beam group or beam pattern with more than one beam via digital beam forming or multi-panel beam forming). In this case, the active transmit beam 210-a (TxBeam1) shown and described with reference to FIG. 2 is equivalent to or exchangeable with a first active transmit beam pattern or a first active transmit beam group used for transmissions simultaneously to a first peer UE group and the receive beam 205-a (RxBeam1) shown and described with reference to FIG. 2 is equivalent to or exchangeable with a first active receive beam pattern or a first active receive beam group used for sensing simultaneously, where the first active receive beam group is corresponding to the first transmit beam group (e.g., with same spatial direction or TCI state with QL type D respectively). Similarly, the active transmit beam 210-b (TxBeam2) shown and described with reference to FIG. 2 is equivalent to or exchangeable with a second active transmit beam pattern or a second active transmit beam group used for transmissions simultaneously to a second peer UE group and the receive beam 205-a (RxBeam1) shown and described with reference to FIG. 2 is equivalent to or exchangeable with a second active receive beam pattern or a second active receive beam group used for sensing simultaneously, where the second active receive beam group is corresponding to the second transmit beam group.

Figure 7:
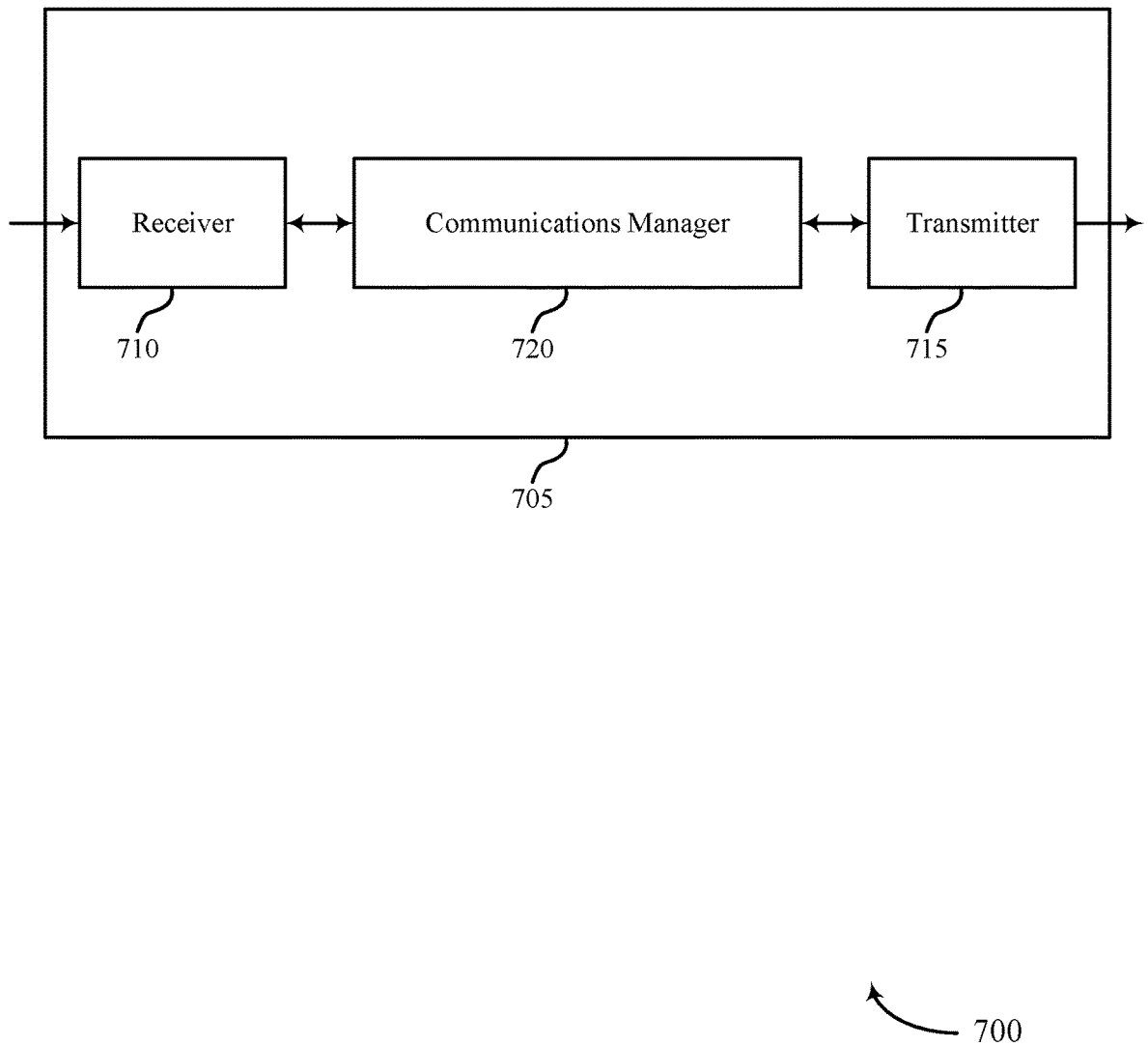
FIGS. 7 and 8 show examples of block diagrams of devices that support spatial sensing techniques for sidelink communications in accordance with one or more aspects of the present disclosure.

FIG. 7 shows a block diagram 700 of a device 705 that supports spatial sensing techniques for sidelink communications in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to spatial sensing techniques for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to spatial sensing techniques for sidelink communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of spatial sensing techniques for sidelink communications as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples disclosed herein. For example, the communications manager 720 may be capable of, configured to, or operable to support a means for monitoring sidelink transmissions, during a sensing window, using a set of multiple active receive beams of a first UE (such as the device 705) in accordance with a spatial sensing configuration of the first UE, where the set of multiple active receive beams are usable for sidelink reception and correspond to a set of multiple active transmit beams of the first UE that are usable for sidelink transmission. The communications manager 720 may be capable of, configured to, or operable to support a means for selecting a set of multiple candidate resource sets associated respectively with the set of multiple active receive beams, based on monitoring sidelink transmissions using a set of multiple active receive beams. The communications manager 720 may be capable of, configured to, or operable to support a means for transmitting, to a second UE via an active transmit beam of the set of multiple active transmit beams, a sidelink message via one or more resources selected from a candidate resource set of the set of multiple candidate resource sets, where the candidate resource set is associated with an active receive beam corresponding to the active transmit beam.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing overhead and more efficient utilization of communication resources, among other benefits.

Figure 8:
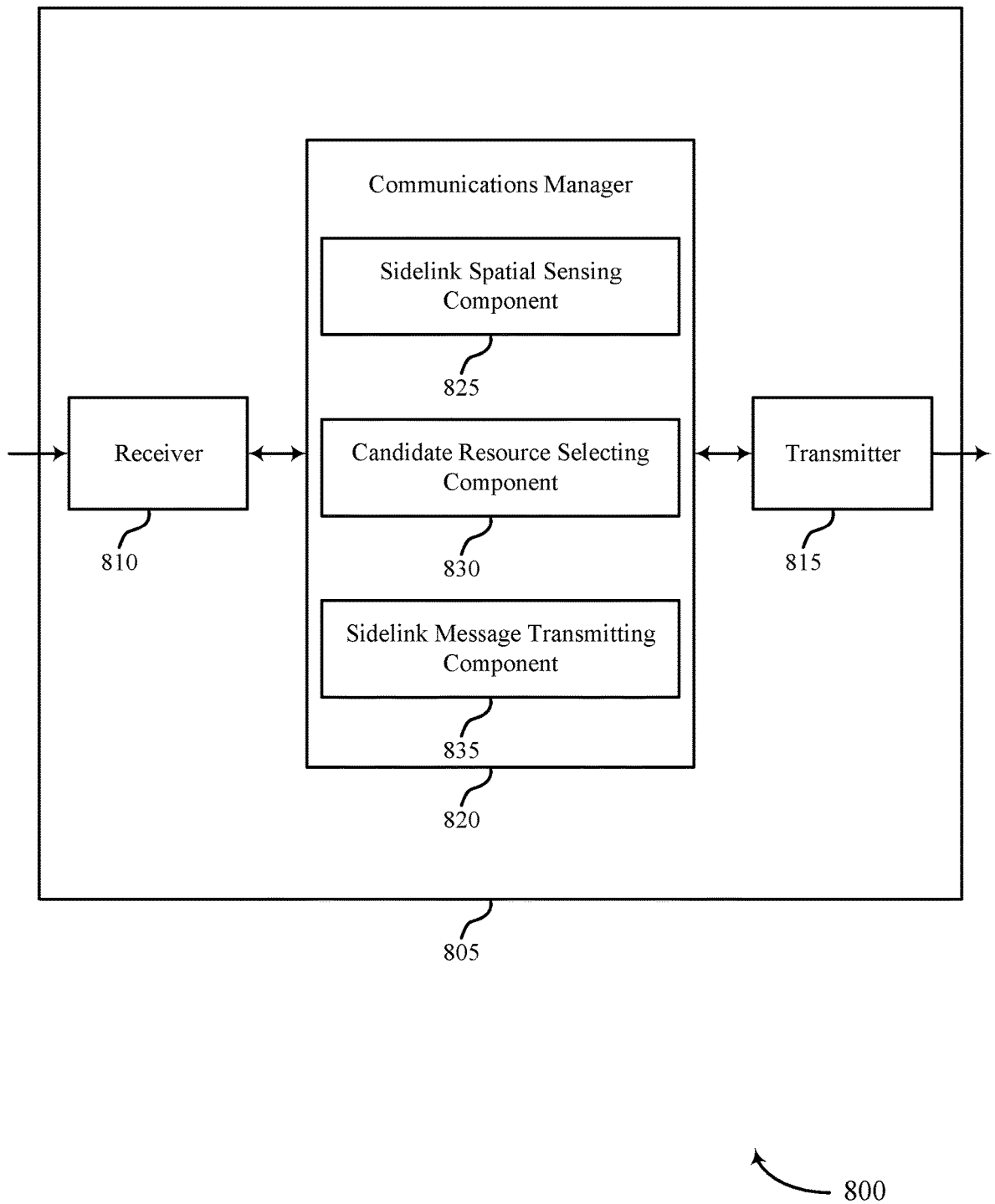

FIG. 8 shows a block diagram 800 of a device 805 that supports spatial sensing techniques for sidelink communications in accordance with one or more aspects of the present disclosure. The device 805 may be an example of aspects of a device 705 or a UE 115 as described herein. The device 805 may include a receiver 810, a transmitter 815, and a communications manager 820. The device 805, or one of more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to spatial sensing techniques for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to spatial sensing techniques for sidelink communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of spatial sensing techniques for sidelink communications as described herein. For example, the communications manager 820 may include a sidelink spatial sensing component 825, a candidate resource selecting component 830, a sidelink message transmitting component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples disclosed herein. The sidelink spatial sensing component 825 may be capable of, configured to, or operable to support a means for monitoring sidelink transmissions, during a sensing window, using a set of multiple active receive beams of a first UE (such as the device 805) in accordance with a spatial sensing configuration of the first UE, where the set of multiple active receive beams are usable for sidelink reception and correspond to a set of multiple active transmit beams of the first UE that are usable for sidelink transmission. The candidate resource selecting component 830 may be capable of, configured to, or operable to support a means for selecting a set of multiple candidate resource sets associated respectively with the set of multiple active receive beams, based on monitoring sidelink transmissions using a set of multiple active receive beams. The sidelink message transmitting component 835 may be capable of, configured to, or operable to support a means for transmitting, to a second UE via an active transmit beam of the set of multiple active transmit beams, a sidelink message via one or more resources selected from a candidate resource set of the set of multiple candidate resource sets, where the candidate resource set is associated with an active receive beam corresponding to the active transmit beam.

Figure 9:
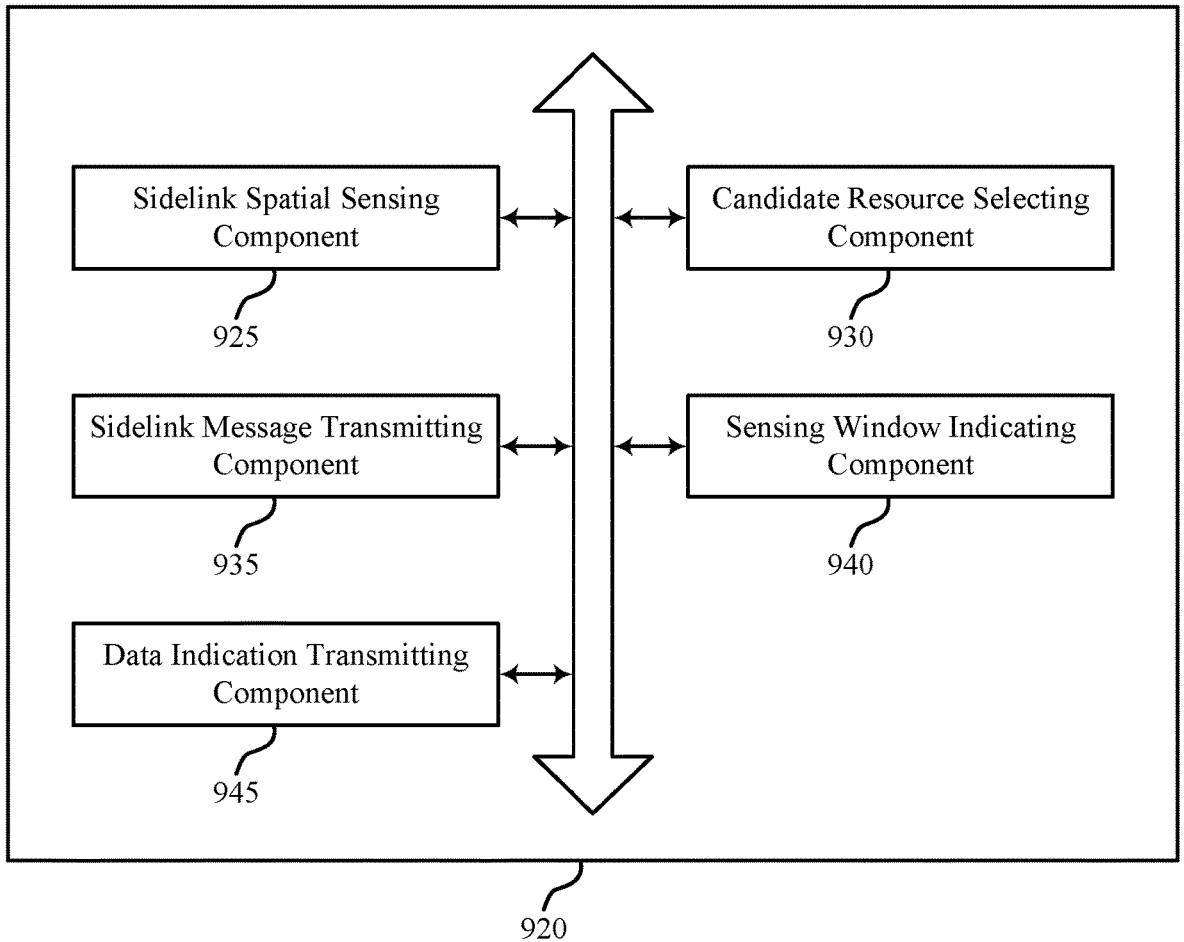
FIG. 9 shows an example of a block diagram of a communications manager that supports spatial sensing techniques for sidelink communications in accordance with one or more aspects of the present disclosure.

FIG. 9 shows a block diagram 900 of a communications manager 920 that supports spatial sensing techniques for sidelink communications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of spatial sensing techniques for sidelink communications as described herein. For example, the communications manager 920 may include a sidelink spatial sensing component 925, a candidate resource selecting component 930, a sidelink message transmitting component 935, a sensing window indicating component 940, a data indication transmitting component 945, or any combination thereof. Each of these components, or components or subcomponents thereof (e.g., one or more processors, one or more memories), may communicate, directly or indirectly, with one another (e.g., via one or more buses).

The communications manager 920 may support wireless communication in accordance with examples disclosed herein. The sidelink spatial sensing component 925 may be capable of, configured to, or operable to support a means for monitoring sidelink transmissions, during a sensing window, using a set of multiple active receive beams of a first UE in accordance with a spatial sensing configuration of the first UE, where the set of multiple active receive beams are usable for sidelink reception and correspond to a set of multiple active transmit beams of the first UE that are usable for sidelink transmission. The candidate resource selecting component 930 may be capable of, configured to, or operable to support a means for selecting a set of multiple candidate resource sets associated respectively with the set of multiple active receive beams, based on monitoring sidelink transmissions using a set of multiple active receive beams. The sidelink message transmitting component 935 may be capable of, configured to, or operable to support a means for transmitting, to a second UE via an active transmit beam of the set of multiple active transmit beams, a sidelink message via one or more resources selected from a candidate resource set of the set of multiple candidate resource sets, where the candidate resource set is associated with an active receive beam corresponding to the active transmit beam.

In some examples, to support monitoring sidelink transmissions using the set of multiple active receive beams, the sidelink spatial sensing component 925 may be capable of, configured to, or operable to support a means for monitoring sidelink transmissions using each of the set of multiple active receive beams for a respective time duration within the sensing window in accordance with an active receive beam sweeping pattern of the spatial sensing configuration.

In some examples, to support monitoring sidelink transmissions using the set of multiple active receive beams, the sidelink spatial sensing component 925 may be capable of, configured to, or operable to support a means for performing, by a PHY layer of the first UE, two or more iterations of beam sweeping in accordance with the active receive beam sweeping pattern during the sensing window.

In some examples, to support selecting a set of multiple candidate resource sets, the candidate resource selecting component 930 may be capable of, configured to, or operable to support a means for outputting to a MAC layer of the first UE, by a PHY layer of the first UE, an indication of at least a respective candidate resource set associated with one of the set of multiple active receive beams used for monitoring sidelink transmissions during the sensing window.

In some examples, the candidate resource selecting component 930 may be capable of, configured to, or operable to support a means for selecting, by a MAC layer of the first UE, the one or more resources from a candidate resource set associated with the active receive beam based on selection of the active transmit beam for transmission of the sidelink message.

In some examples, to support monitoring sidelink transmissions using the set of multiple active receive beams, the sensing window indicating component 940 may be capable of, configured to, or operable to support a means for outputting to a PHY layer of the first UE, by a MAC layer of the first UE, an indication of a respective active sensing window for each of the set of multiple active receive beams, where the respective active sensing window for the active receive beam includes a respective sidelink DRX active time for the active transmit beam corresponding to the active receive beam. In some examples, to support monitoring sidelink transmissions using the set of multiple active receive beams, the sidelink spatial sensing component 925 may be capable of, configured to, or operable to support a means for monitoring sidelink transmissions by the PHY layer of the first UE using at least the active receive beam during the respective active sensing window for the active receive beam in accordance with an adaptive spatial sensing scheme of the spatial sensing configuration.

In some examples, to support monitoring sidelink transmissions by the PHY layer of the first UE using at least the active receive beam, the sensing window indicating component 940 may be capable of, configured to, or operable to support a means for monitoring sidelink transmissions using two or more active receive beams during a first active sensing window associated with a first active receive beam based on the first active sensing window of the first active receive beam overlapping with one or more active sensing windows associated with one or more active receive beams respectively.

In some examples, to support monitoring sidelink transmissions using the two or more active receive beams, the sidelink spatial sensing component 925 may be capable of, configured to, or operable to support a means for monitoring sidelink transmissions using each of the two or more active receive beams for a respective time duration in accordance with the spatial sensing configuration of the first UE.

In some examples, to support monitoring sidelink transmissions by the PHY layer of the first UE using at least the active receive beam, the sidelink spatial sensing component 925 may be capable of, configured to, or operable to support a means for monitoring sidelink transmissions using the active receive beam according to a respective transmission priority of the respective sidelink DRX active time for the active transmit beam corresponding to the active receive beam.

In some examples, the candidate resource selecting component 930 may be capable of, configured to, or operable to support a means for outputting, by the PHY layer of the first UE, an indication of the candidate resource set for the active receive beam based on one or more sidelink DRX active times that coincide with the respective active sensing window of the active receive beam.

In some examples, the candidate resource selecting component 930 may be capable of, configured to, or operable to support a means for selecting, by the MAC layer of the first UE, the one or more resources from the candidate resource set associated with the respective sidelink DRX active time of the active transmit beam corresponding to the active receive beam. In some examples, the sidelink message transmitting component 935 may be capable of, configured to, or operable to support a means for transmitting the sidelink message to the second UE via the active transmit beam during the respective sidelink DRX active time using the one or more resources selected from the candidate resource set associated with the active receive beam.

In some examples, to support monitoring sidelink transmissions using the set of multiple active receive beams, the data indication transmitting component 945 may be capable of, configured to, or operable to support a means for transmitting, from a MAC layer of the first UE to a PHY layer of the first UE, a respective data indication prior to a respective sidelink DRX active time for each of the set of multiple active transmit beams corresponding to the set of multiple active receive beams. In some examples, to support monitoring sidelink transmissions using the set of multiple active receive beams, the sidelink spatial sensing component 925 may be capable of, configured to, or operable to support a means for monitoring sidelink transmissions using the active receive beam of the set of multiple active receive beams according to the respective data indication from the MAC layer for the active transmit beam corresponding to the active receive beam.

In some examples, the respective data indication includes a data status indicator associated with the respective sidelink DRX active time, a QoS indicator associated with the respective sidelink DRX active time, or both.

In some examples, the active transmit beam and the active receive beam of the first UE correspond to a same spatial direction or TCI state with QCL type-D.

In some examples, the candidate resource selecting component 930 may be capable of, configured to, or operable to support a means for outputting, by the PHY layer of the first UE, an indication of the candidate resource set associated with the active receive beam based on the respective data indication for the respective sidelink DRX active time of the active transmit beam corresponding to the active receive beam.

In some examples, the sensing window indicating component 940 may be capable of, configured to, or operable to support a means for allocating a quantity of time resources in the sensing window to the active receive beam based on a transmission priority or PDB of the respective sidelink DRX active time for the active transmit beam corresponding to the active receive beam, where the transmission priority or PDB is indicated via a QoS indicator with the respective data indication associated with the respective sidelink DRX active time.

In some examples, the sidelink spatial sensing component 925 may be capable of, configured to, or operable to support a means for refraining from monitoring sidelink transmissions using at least one active receive beam of the set of multiple active receive beams based on a buffer status or data volume indicated via the data status indicator associated with the respective sidelink DRX active time of at least one active transmit beam corresponding to the at least one active receive beam.

In some examples, a quantity of candidate resources associated with the at least one active receive beam that the first UE refrains from monitoring is less than a quantity of candidate resources associated with the active receive beam that is used for monitoring during the sensing window.

In some examples, the one or more resources selected for transmission of the sidelink message to the second UE are within the respective sidelink DRX active time of the active transmit beam corresponding to the active receive beam.

Figure 10:
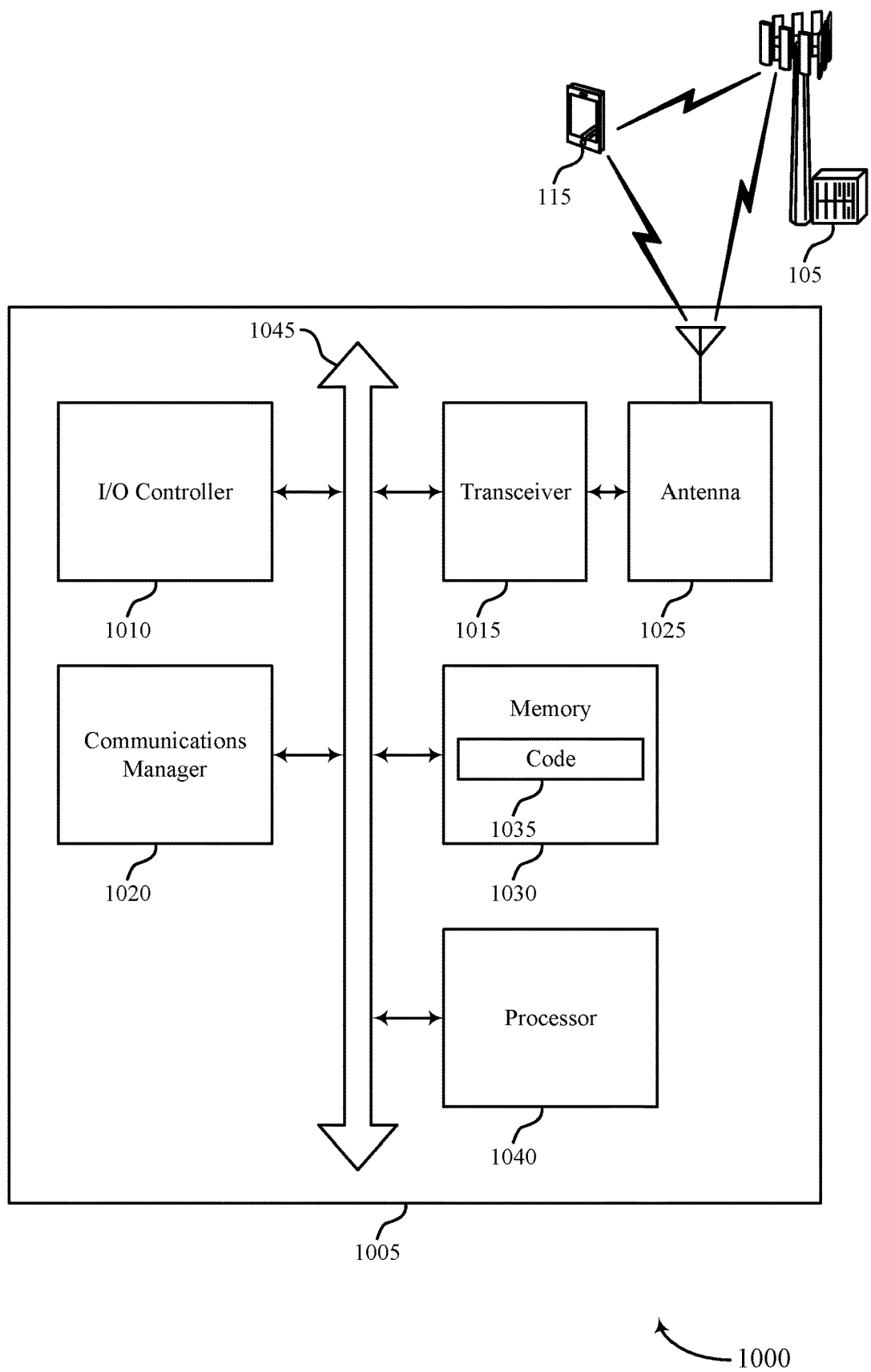
FIG. 10 shows an example of a diagram of a system including a device that supports spatial sensing techniques for sidelink communications in accordance with one or more aspects of the present disclosure.

FIG. 10 shows a diagram of a system 1000 including a device 1005 that supports spatial sensing techniques for sidelink communications in accordance with one or more aspects of the present disclosure. The device 1005 may be an example of or include the components of a device 705, a device 805, or a UE 115 as described herein. The device 1005 may communicate (e.g., wirelessly) with one or more network entities 105, at least one UE 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, processor-executable code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting spatial sensing techniques for sidelink communications).

For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs.

The processing system may be configured to perform one or more of the functions described herein. As such, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1030 or otherwise, to perform one or more of the functions described herein.

The communications manager 1020 may support wireless communication in accordance with examples disclosed herein. For example, the communications manager 1020 may be capable of, configured to, or operable to support a means for monitoring sidelink transmissions, during a sensing window, using a set of multiple active receive beams of a first UE (such as the device 1005) in accordance with a spatial sensing configuration of the first UE, where the set of multiple active receive beams are usable for sidelink reception and correspond to a set of multiple active transmit beams of the first UE that are usable for sidelink transmission. The communications manager 1020 may be capable of, configured to, or operable to support a means for selecting a set of multiple candidate resource sets associated respectively with the set of multiple active receive beams, based on monitoring sidelink transmissions using a set of multiple active receive beams. The communications manager 1020 may be capable of, configured to, or operable to support a means for transmitting, to a second UE via an active transmit beam of the set of multiple active transmit beams, a sidelink message via one or more resources selected from a candidate resource set of the set of multiple candidate resource sets, where the candidate resource set is associated with an active receive beam corresponding to the active transmit beam.

By including or configuring the communications manager 1020 in accordance with examples as described herein, the device 1005 may support techniques for improved sidelink spatial sensing, greater processing efficiency, and improved coordination between sidelink devices, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of spatial sensing techniques for sidelink communications as described herein, or the at least one processor 1040 and the at least one memory 1030 may be otherwise configured to, individually or collectively, perform or support such operations.

Figure 11:
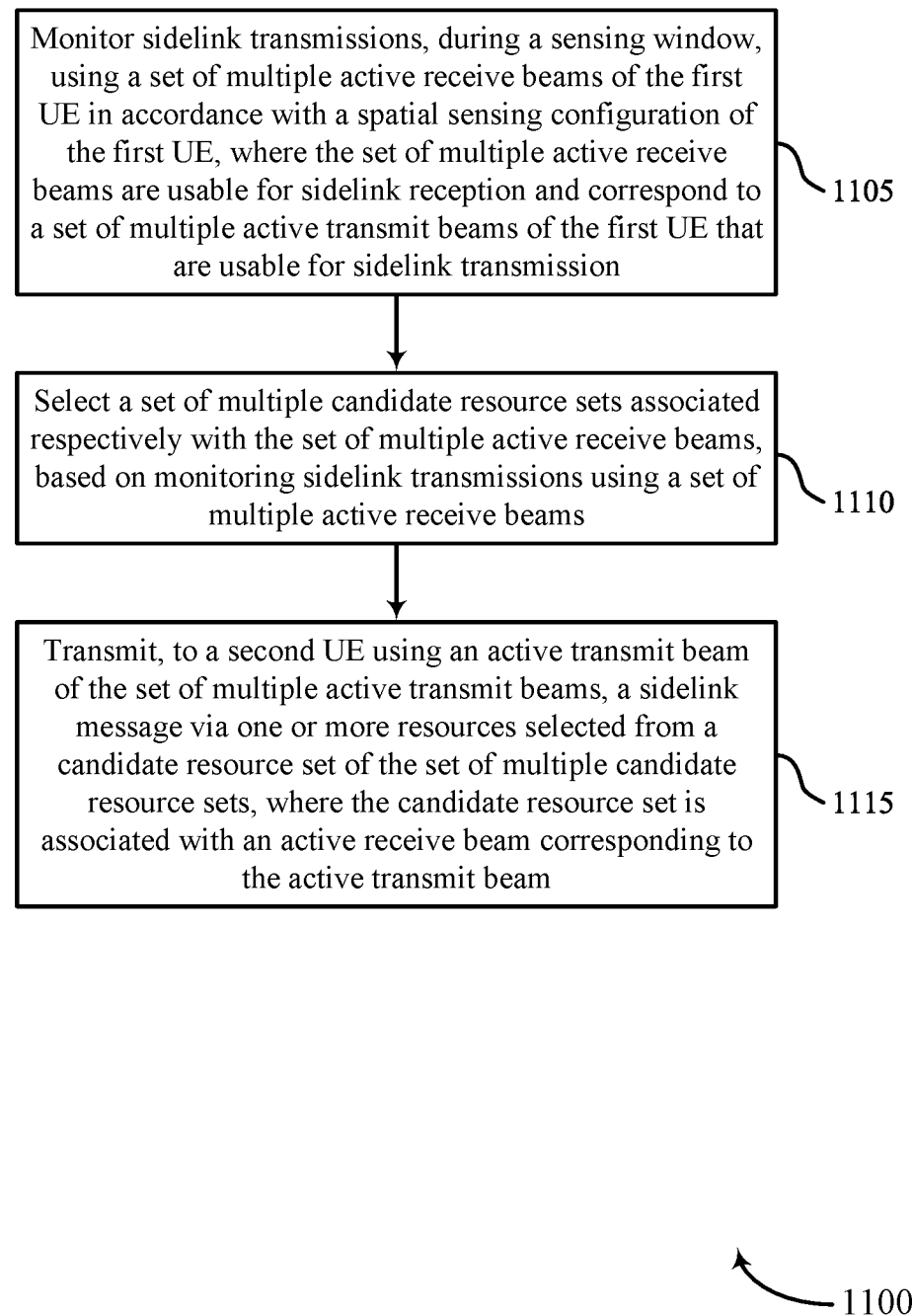
FIG. 11 shows an example of a flowchart illustrating a method that supports spatial sensing techniques for sidelink communications in accordance with one or more aspects of the present disclosure.

FIG. 11 shows a flowchart illustrating a method 1100 that supports spatial sensing techniques for sidelink communications in accordance with aspects of the present disclosure. The operations of the method 1100 may be implemented by a first UE, such as the UE 115-*d* shown and described with reference to FIGS. 2 and 6. In some examples, the first UE may execute a set of instructions to control the functional elements of the first UE to perform the described functions. Additionally, or alternatively, the first UE may perform aspects of the described functions using special-purpose hardware.

At 1105, the first UE may monitor sidelink transmissions, during a sensing window, using a set of multiple active receive beams of the first UE in accordance with a spatial sensing configuration of the first UE, where the set of multiple active receive beams are usable for sidelink reception and correspond to a set of multiple active transmit beams of the first UE that are usable for sidelink transmission. In some examples, aspects of the operations of 1105 may be performed by a sidelink spatial sensing component 925, as described with reference to FIG. 9.

At 1110, the first UE may select a set of multiple candidate resource sets associated respectively with the set of multiple active receive beams, based on monitoring sidelink transmissions using a set of multiple active receive beams. In some examples, aspects of the operations of 1110 may be performed by a candidate resource selecting component 930, as described with reference to FIG. 9.

At 1115, the first UE may transmit, to a second UE via an active transmit beam of the set of multiple active transmit beams, a sidelink message via one or more resources selected from a candidate resource set of the set of multiple candidate resource sets, where the candidate resource set is associated with an active receive beam corresponding to the active transmit beam. In some examples, aspects of the operations of 1115 may be performed by a sidelink message transmitting component 935, as described with reference to FIG. 9.

The following provides an overview of aspects of the present disclosure:

Aspect 1: A method for wireless communication by a first UE, comprising: monitoring sidelink transmissions, during a sensing window, with a plurality of active receive beams of the first UE in accordance with a spatial sensing configuration of the first UE, wherein the plurality of active receive beams are usable for sidelink reception and correspond to a plurality of active transmit beams of the first UE that are usable for sidelink transmission; selecting a plurality of candidate resource sets associated respectively with the plurality of active receive beams, based at least in part on monitoring sidelink transmissions with a plurality of active receive beams; and transmitting, to a second UE via an active transmit beam of the plurality of active transmit beams, a sidelink message using one or more resources selected from a candidate resource set of the plurality of candidate resource sets, where the candidate resource set is associated with an active receive beam corresponding to the active transmit beam.

Aspect 2: The method of aspect 1, wherein monitoring sidelink transmissions with the plurality of active receive beams comprises: monitoring sidelink transmissions with each of the plurality of active receive beams for a respective time duration within the sensing window in accordance with an active receive beam sweeping pattern of the spatial sensing configuration.

Aspect 3: The method of aspect 2, wherein monitoring sidelink transmissions with the plurality of active receive beams comprises: performing, by a PHY layer of the first UE, two or more iterations of beam sweeping in accordance with the active receive beam sweeping pattern during the sensing window.

Aspect 4: The method of any of aspects 1 through 3, wherein selecting a plurality of candidate resource sets comprises: outputting to a MAC layer of the first UE, by a PHY layer of the first UE, an indication of at least a respective candidate resource set associated with one of the plurality of active receive beams used for monitoring sidelink transmissions during the sensing window.

Aspect 5: The method of any of aspects 1 through 4, further comprising: selecting, by a MAC layer of the first UE, the one or more resources from a candidate resource set associated with the active receive beam based at least in part on selection of the active transmit beam for transmission of the sidelink message.

Aspect 6: The method of any of aspects 1 through 5, wherein monitoring sidelink transmissions with the plurality of active receive beams comprises: outputting to a PHY layer of the first UE, by a MAC layer of the first UE, an indication of a respective active sensing window for each of the plurality of active receive beams, wherein the respective active sensing window for the active receive beam comprises a respective sidelink DRX active time for the active transmit beam corresponding to the active receive beam; and Monitoring sidelink transmissions by the PHY layer of the first UE with at least the active receive beam during the respective active sensing window for the active receive beam in accordance with an adaptive spatial sensing scheme of the spatial sensing configuration.

Aspect 7: The method of aspect 6, wherein monitoring sidelink transmissions by the PHY layer of the first UE with at least the active receive beam comprises: monitoring sidelink transmissions with two or more active receive beams during a first active sensing window associated with a first active receive beam based at least in part on the first active sensing window of the first active receive beam overlapping with one or more active sensing windows associated with one or more active receive beams respectively.

Aspect 8: The method of aspect 7, wherein monitoring sidelink transmissions with the two or more active receive beams comprises: monitoring sidelink transmissions with each of the two or more active receive beams for a respective time duration in accordance with the spatial sensing configuration of the first UE.

Aspect 9: The method of any of aspects 6 through 8, wherein monitoring sidelink transmissions by the PHY layer of the first UE with at least the active receive beam comprises: monitoring sidelink transmissions with the active receive beam according to a respective transmission priority of the respective sidelink DRX active time for the active transmit beam corresponding to the active receive beam.

Aspect 10: The method of any of aspects 6 through 9, further comprising: outputting, by the PHY layer of the first UE, an indication of the candidate resource set for the active receive beam based at least in part on one or more sidelink DRX active times that coincide with the respective active sensing window of the active receive beam.

Aspect 11: The method of any of aspects 6 through 10, further comprising: selecting, by the MAC layer of the first UE, the one or more resources from the candidate resource set associated with the respective sidelink DRX active time of the active transmit beam corresponding to the active receive beam; and transmitting the sidelink message to the second UE via the active transmit beam during the respective sidelink DRX active time using the one or more resources selected from the candidate resource set associated with the active receive beam.

Aspect 12: The method of any of aspects 1 through 11, wherein monitoring sidelink transmissions with the plurality of active receive beams comprises: transmitting, from a MAC layer of the first UE to a PHY layer of the first UE, a respective data indication prior to a respective sidelink DRX active time for each of the plurality of active transmit beams corresponding to the plurality of active receive beams; and monitoring sidelink transmissions with the active receive beam of the plurality of active receive beams according to the respective data indication from the MAC layer for the active transmit beam corresponding to the active receive beam.

Aspect 13: The method of aspect 12, wherein a quantity of candidate resources associated with the at least one active receive beam is less than a quantity of candidate resources associated with the active receive beam that is used for monitoring during the sensing window.

Aspect 14: The method of any of aspects 12 through 13, wherein the one or more resources selected for transmission of the sidelink message to the second UE are within the respective sidelink DRX active time of the active transmit beam corresponding to the active receive beam.

Aspect 15: The method of any of aspects 12 through 14, further comprising: outputting, by the PHY layer of the first UE, an indication of the candidate resource set associated with the active receive beam based at least in part on the respective data indication for the respective sidelink DRX active time of the active transmit beam corresponding to the active receive beam.

Aspect 16: The method of any of aspects 12 through 15, wherein the respective data indication comprises a data status indicator associated with the respective sidelink DRX active time, a QoS indicator associated with the respective sidelink DRX active time, or both.

Aspect 17: The method of aspect 16, further comprising: allocating a quantity of time resources in the sensing window to the active receive beam based at least in part on a transmission priority or PDB of the respective sidelink DRX active time for the active transmit beam corresponding to the active receive beam, wherein the transmission priority or PDB is indicated via the QoS indicator with the respective data indication associated with the respective sidelink DRX active time.

Aspect 18: The method of any of aspects 16 through 17, further comprising: refraining from monitoring sidelink transmissions with at least one active receive beam of the plurality of active receive beams based at least in part on a buffer status or data volume indicated via the data status indicator associated with the respective sidelink DRX active time of at least one active transmit beam corresponding to the at least one active receive beam.

Aspect 19: The method of any of aspects 1 through 11, wherein the active transmit beam and the active receive beam of the first UE correspond to a same spatial direction or transmission configuration indicator (TCI) state with quasi-co-location (QCL) type-D.

Aspect 20: A first UE, comprising one or more memories storing processor-executable code, and one or more processors coupled with the one or more memories and individually or collectively operable to execute the code to cause the first UE to perform a method of any of aspects 1 through 19.

Aspect 21: A first UE, comprising at least one means for performing a method of any of aspects 1 through 19.

Aspect 22: A non-transitory computer-readable medium storing code for wireless communication, the code comprising instructions executable by one or more processors to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Also, as used herein, the phrase "a set" shall be construed as including the possibility of a set with one member. That is, the phrase "a set" shall be construed in the same manner as "one or more." The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
   one or more memories storing processor-executable code; and
   one or more processors coupled with the one or more memories and individually or collectively operable to execute the code to cause the first UE to:
      monitor sidelink transmissions, during a sensing window, using a plurality of active receive beams of the first UE in accordance with a spatial sensing configuration of the first UE, wherein the plurality of active receive beams are usable for sidelink reception and correspond to a plurality of active transmit beams of the first UE that are usable for sidelink transmission;
      select a plurality of candidate resource sets associated respectively with the plurality of active receive beams, based at least in part on monitoring the sidelink transmissions using the plurality of active receive beams; and
      transmit, to a second UE, using an active transmit beam of the plurality of active transmit beams, a sidelink message via one or more resources selected from a candidate resource set of the plurality of candidate resource sets, wherein the candidate resource set is associated with an active receive beam corresponding to the active transmit beam.

2. The first UE of claim 1, wherein, to monitor the sidelink transmissions using the plurality of active receive beams, the one or more processors are individually or collectively operable to execute the code to cause the first UE to:
   monitor the sidelink transmissions using each of the plurality of active receive beams for a respective time duration within the sensing window in accordance with an active receive beam sweeping pattern of the spatial sensing configuration.

3. The first UE of claim 2, wherein, to monitor the sidelink transmissions using the plurality of active receive beams, the one or more processors are individually or collectively operable to execute the code to cause the first UE to:
   perform, by a physical (PHY) layer of the first UE, two or more iterations of beam sweeping in accordance with the active receive beam sweeping pattern during the sensing window.

4. The first UE of claim 1, wherein, to select the plurality of candidate resource sets, the one or more processors are individually or collectively operable to execute the code to cause the first UE to:
   output to a medium access control (MAC) layer of the first UE, by a physical (PHY) layer of the first UE, an indication of at least a respective candidate resource set associated with one of the plurality of active receive beams used for monitoring the sidelink transmissions during the sensing window.

5. The first UE of claim 1, wherein the one or more processors are individually or collectively further operable to execute the code to cause the first UE to:
   select, by a medium access control (MAC) layer of the first UE, the one or more resources from the candidate resource set associated with the active receive beam based at least in part on selection of the active transmit beam for transmission of the sidelink message.

6. The first UE of claim 1, wherein, to monitor the sidelink transmissions using the plurality of active receive beams, the one or more processors are individually or collectively operable to execute the code to cause the first UE to:
   output to a physical (PHY) layer of the first UE, by a medium access control (MAC) layer of the first UE, an indication of a respective active sensing window for each of the plurality of active receive beams, wherein the respective active sensing window for the active receive beam comprises a respective sidelink discontinuous reception (DRX) active time for the active transmit beam corresponding to the active receive beam; and
   monitor the sidelink transmissions by the PHY layer of the first UE using at least the active receive beam during the respective active sensing window for the active receive beam in accordance with an adaptive spatial sensing scheme of the spatial sensing configuration.

7. The first UE of claim 6, wherein, to monitor the sidelink transmissions by the PHY layer of the first UE using at least the active receive beam, the one or more processors are individually or collectively operable to execute the code to cause the first UE to:
   monitor the sidelink transmissions using two or more active receive beams during a first active sensing window associated with a first active receive beam based at least in part on the first active sensing window of the first active receive beam overlapping with one or more active sensing windows associated with one or more active receive beams respectively.

8. The first UE of claim 7, wherein, to monitor the sidelink transmissions using the two or more active receive beams, the one or more processors are individually or collectively operable to execute the code to cause the first UE to:
monitor the sidelink transmissions using each of the two or more active receive beams for a respective time duration in accordance with the spatial sensing configuration of the first UE.

9. The first UE of claim 6, wherein, to monitor the sidelink transmissions by the PHY layer of the first UE using at least the active receive beam, the one or more processors are individually or collectively operable to execute the code to cause the first UE to:
monitor the sidelink transmissions using the active receive beam according to a respective transmission priority of the respective sidelink DRX active time for the active transmit beam corresponding to the active receive beam.

10. The first UE of claim 6, wherein the one or more processors are individually or collectively further operable to execute the code to cause the first UE to:
output, by the PHY layer of the first UE, an indication of the candidate resource set for the active receive beam based at least in part on one or more sidelink DRX active times that coincide with the respective active sensing window of the active receive beam.

11. The first UE of claim 6, wherein the one or more processors are individually or collectively further operable to execute the code to cause the first UE to:
select, by the MAC layer of the first UE, the one or more resources from the candidate resource set associated with the respective sidelink DRX active time of the active transmit beam corresponding to the active receive beam; and
transmit the sidelink message to the second UE via the active transmit beam during the respective sidelink DRX active time using the one or more resources selected from the candidate resource set associated with the active receive beam.

12. The first UE of claim 1, wherein, to monitor the sidelink transmissions using the plurality of active receive beams, the one or more processors are individually or collectively operable to execute the code to cause the first UE to:
output, from a medium access control (MAC) layer of the first UE to a physical (PHY) layer of the first UE, a respective data indication prior to a respective sidelink discontinuous reception (DRX) active time for each of the plurality of active transmit beams corresponding to the plurality of active receive beams; and
monitor the sidelink transmissions using the active receive beam of the plurality of active receive beams according to the respective data indication from the MAC layer for the active transmit beam corresponding to the active receive beam.

13. The first UE of claim 12, wherein a quantity of candidate resources associated with the at least one active receive beam that the first UE refrains from monitoring is less than a quantity of candidate resources associated with the active receive beam that is used for monitoring during the sensing window.

14. The first UE of claim 12, wherein the one or more resources selected for transmission of the sidelink message to the second UE are within the respective sidelink DRX active time of the active transmit beam corresponding to the active receive beam.

15. The first UE of claim 12, wherein the one or more processors are individually or collectively further operable to execute the code to cause the first UE to:
output, by the PHY layer of the first UE, an indication of the candidate resource set associate with the active receive beam based at least in part on the respective data indication for the respective sidelink DRX active time of the active transmit beam corresponding to the active receive beam.

16. The first UE of claim 12, wherein the respective data indication comprises a data status indicator associated with the respective sidelink DRX active time, a quality of service (QOS) indicator associated with the respective sidelink DRX active time, or both.

17. The first UE of claim 16, wherein the one or more processors are individually or collectively further operable to execute the code to cause the first UE to:
allocate a quantity of time resources in the sensing window to the active receive beam based at least in part on a transmission priority or packet delay budget (PDB) of the respective sidelink DRX active time for the active transmit beam corresponding to the active receive beam, wherein the transmission priority or PDB is indicated via the QoS indicator with the respective data indication associated with the respective sidelink DRX active time.

18. The first UE of claim 16, wherein the one or more processors are individually or collectively further operable to execute the code to cause the first UE to:
refrain from monitoring the sidelink transmissions using at least one active receive beam of the plurality of active receive beams based at least in part on a buffer status or data volume indicated via the data status indicator associated with the respective sidelink DRX active time of at least one active transmit beam corresponding to the at least one active receive beam.

19. The first UE of claim 12, wherein the active transmit beam and the active receive beam of the first UE correspond to a same spatial direction or transmission configuration indicator (TCI) state with quasi-co-location (QCL) type-D.

20. A method for wireless communication by a first user equipment (UE), comprising:
monitoring sidelink transmissions, during a sensing window, using a plurality of active receive beams of the first UE in accordance with a spatial sensing configuration of the first UE, wherein the plurality of active receive beams are usable for sidelink reception and correspond to a plurality of active transmit beams of the first UE that are usable for sidelink transmission;
selecting a plurality of candidate resource sets associated respectively with the plurality of active receive beams, based at least in part on monitoring the sidelink transmissions using the plurality of active receive beams; and
transmitting, to a second UE via an active transmit beam of the plurality of active transmit beams, a sidelink message via one or more resources selected from a candidate resource set of the plurality of candidate resource sets, where the candidate resource set is associated with an active receive beam corresponding to the active transmit beam.

21. The method of claim 20, wherein monitoring the sidelink transmissions using the plurality of active receive beams comprises:
monitoring the sidelink transmissions using each of the plurality of active receive beams for a respective time duration within the sensing window in accordance with an active receive beam sweeping pattern of the spatial sensing configuration.

22. The method of claim 21, wherein monitoring the sidelink transmissions using the plurality of active receive beams comprises:
   performing, by a physical (PHY) layer of the first UE, two or more iterations of beam sweeping in accordance with the active receive beam sweeping pattern during the sensing window.

23. The method of claim 20, wherein selecting the plurality of candidate resource sets comprises:
   outputting to a medium access control (MAC) layer of the first UE, by a physical (PHY) layer of the first UE, an indication of at least a respective candidate resource set associated with one of the plurality of active receive beams used for monitoring the sidelink transmissions during the sensing window.

24. The method of claim 20, further comprising:
   selecting, by a medium access control (MAC) layer of the first UE, the one or more resources from the candidate resource set associated with the active receive beam based at least in part on selection of the active transmit beam for transmission of the sidelink message.

25. The method of claim 20, wherein monitoring the sidelink transmissions using the plurality of active receive beams comprises:
   outputting to a physical (PHY) layer of the first UE, by a medium access control (MAC) layer of the first UE, an indication of a respective active sensing window for each of the plurality of active receive beams, wherein the respective active sensing window for the active receive beam comprises a respective sidelink discontinuous reception (DRX) active time for the active transmit beam corresponding to the active receive beam; and
   monitoring the sidelink transmissions by the PHY layer of the first UE using at least the active receive beam during the respective active sensing window for the active receive beam in accordance with an adaptive spatial sensing scheme of the spatial sensing configuration.

26. The method of claim 25, wherein monitoring the sidelink transmissions by the PHY layer of the first UE using at least the active receive beam comprises:
   monitoring the sidelink transmissions using two or more active receive beams during a first active sensing window associated with a first active receive beam based at least in part on the first active sensing window of the first active receive beam overlapping with one or more active sensing windows associated with one or more active receive beams respectively.

27. The method of claim 26, wherein monitoring the sidelink transmissions using the two or more active receive beams comprises:
   monitoring the sidelink transmissions using each of the two or more active receive beams for a respective time duration in accordance with the spatial sensing configuration of the first UE.

28. The method of claim 25, wherein monitoring the sidelink transmissions by the PHY layer of the first UE using at least the active receive beam comprises:
   monitoring the sidelink transmissions using the active receive beam according to a respective transmission priority of the respective sidelink DRX active time for the active transmit beam corresponding to the active receive beam.

29. A first user equipment (UE) for wireless communication, comprising:
   means for monitoring sidelink transmissions, during a sensing window, using a plurality of active receive beams of the first UE in accordance with a spatial sensing configuration of the first UE, wherein the plurality of active receive beams are usable for sidelink reception and correspond to a plurality of active transmit beams of the first UE that are usable for sidelink transmission;
   means for selecting a plurality of candidate resource sets associated respectively with the plurality of active receive beams, based at least in part on monitoring the sidelink transmissions using the plurality of active receive beams; and
   means for transmitting, to a second UE via an active transmit beam of the plurality of active transmit beams, a sidelink message via one or more resources selected from a candidate resource set of the plurality of candidate resource sets, where the candidate resource set is associated with an active receive beam corresponding to the active transmit beam.

30. A non-transitory computer-readable medium storing code for wireless communication at a first user equipment (UE), the code comprising instructions executable by one or more processors to:
   monitor sidelink transmissions, during a sensing window, using a plurality of active receive beams of the first UE in accordance with a spatial sensing configuration of the first UE, wherein the plurality of active receive beams are usable for sidelink reception and correspond to a plurality of active transmit beams of the first UE that are usable for sidelink transmission;
   select a plurality of candidate resource sets associated respectively using the plurality of active receive beams, based at least in part on monitoring sidelink transmissions using the plurality of active receive beams; and
   transmit, to a second UE via an active transmit beam of the plurality of active transmit beams, a sidelink message via one or more resources selected from a candidate resource set of the plurality of candidate resource sets, where the candidate resource set is associated with an active receive beam corresponding to the active transmit beam.

* * * * *